(12) United States Patent
Rissa et al.

(10) Patent No.: US 9,210,386 B2
(45) Date of Patent: Dec. 8, 2015

(54) FILTER SETUP LEARNING FOR BINARY SENSOR

(75) Inventors: Tero P. Rissa, Siivikkala (FI); Tuomo Maki-Marttunen, Tampere (FI); Matti Viikinkoski, Tampere (FI)

(73) Assignee: Nokia Technologies Oy, Espoo (FI)

( * ) Notice: Subject to any disclaimer, the term of this patent is extended or adjusted under 35 U.S.C. 154(b) by 191 days.

(21) Appl. No.: 13/518,687

(22) PCT Filed: Dec. 23, 2009

(86) PCT No.: PCT/FI2009/051032
§ 371 (c)(1),
(2), (4) Date: Sep. 21, 2012

(87) PCT Pub. No.: WO2011/076975
PCT Pub. Date: Jun. 30, 2011

(65) Prior Publication Data
US 2013/0011050 A1    Jan. 10, 2013

(51) Int. Cl.
*G06K 9/40* (2006.01)
*H04N 9/04* (2006.01)
*H04N 5/235* (2006.01)
*H04N 5/335* (2011.01)

(52) U.S. Cl.
CPC ............. *H04N 9/045* (2013.01); *H04N 5/2351* (2013.01); *H04N 5/335* (2013.01)

(58) Field of Classification Search
CPC ............. H04N 5/217; H04N 19/0089; H04N 2209/047; H04N 13/0257; H04N 2209/045; H04N 5/225

USPC .................. 382/156, 162, 167; 348/65, 273
See application file for complete search history.

(56) References Cited

U.S. PATENT DOCUMENTS

2007/0147677 A1   6/2007   Matsushita et al. ........... 382/159
2008/0123097 A1   5/2008   Muhammed et al. ......... 356/419

FOREIGN PATENT DOCUMENTS

CN             101214142 A        7/2008

OTHER PUBLICATIONS

Mukherjee et al: "Markov random field processing for color demosaicking", Pattern Recognition Letters, 2001.*
Fossum, E.R., "Gigapixel Digital Film Sensor (DFS) Proposal", Nanospace Manipulation of Photons and Electrons for Nanovision Systems, The 7$^{th}$ Takayanagi Kenjiro Memorial Symposium and the 2$^{nd}$ International Symposium on Nanovision Science, University of Shizuoka, Hamamatsu, Japan, Oct. 25-26, 2005, 5 pgs.
Gunturk, B.K., et al., "Demosaicking: Color Filter Array Interpolation", IEEE Singal Processing Magazine, Jan. 2005, 11 pgs.

(Continued)

*Primary Examiner* — Ruiping Li
(74) *Attorney, Agent, or Firm* — Harrington & Smith

(57) ABSTRACT

The invention relates to forming an image using binary pixels. Binary pixels are pixels that have only two states, a white state when the pixel is exposed and a black state when the pixel is not exposed. The binary pixels have color filters on top of them, and the setup of color filters may be initially unknown. A setup making use of a statistical approach may be used to determine the color filter setup to produce correct output images. Subsequently, the color filter information may be used with the binary pixel array to produce images from the input images that the binary pixel array records.

19 Claims, 16 Drawing Sheets

(56) References Cited

OTHER PUBLICATIONS

"Bayer Filter", Internet article, http://en.wikipedia.org/wiki/Bayer_filter, Jun. 20, 2012, 5 pgs.

Sbaiz, L., et al., "The Gigavision Camera" IEEE International Conference on Acoustics, Speech and Signal Processing, Apr. 2009, 4 pgs.

"Color Calibration", Internet article, http://en.wikipedia.org, Jun. 20, 2012, 3 pgs.

Yang, F. et al., "Image Reconstructions in the Gigavision Camera", 2010, 8 pgs.

"Foveon X3 Sensor", Internet article, http://en.wikipedia.org/wiki/Foveon_X3_sensor, Jun. 20, 2012, 6 pgs.

Lukac, Rastislav, et al., "Universal demosaicking for imaging pipelines with an RGB color filter array", Pattern Recognition 38, pp. 2208-2012, (2005).

* cited by examiner

FILTER SETUP LEARNING FOR BINARY SENSOR

BACKGROUND

A binary image sensor may comprise e.g. more than $10^9$ individual light detectors arranged as a two-dimensional array. Each individual light detector has two possible states: an unexposed "black" state and an exposed "white" state. Thus, an individual detector does not reproduce different shades of grey. The local brightness of an image may be determined e.g. by the local spatial density of white pixels. The size of the individual light detectors of a binary image sensor may be smaller than the minimum size of a focal spot which can be provided by the imaging optics of a digital camera.

However, storing or transferring binary digital images as such may be difficult or impossible due to the large data size. The resulting image data may even be so large that storing and processing of the binary digital images becomes impractical in a digital camera, or even in a desktop computer.

There is, therefore, a need for a solution that improves the applicability of binary digital image sensors to practical solutions.

SUMMARY

Now there has been invented an improved method and technical equipment implementing the method, by which the above problems are alleviated. Various aspects of the invention include a method, an apparatus, a server, a client and a computer readable medium comprising a computer program stored therein, which are characterized by what is stated in the independent claims. Various embodiments of the invention are disclosed in the dependent claims.

In an example setup, light of known color is applied to a group of binary pixels that have color filters. The color filter setup may be initially unknown. Values from the binary pixels are recorded, and these values are used to determine the colors of the color filters. The colors are determined using a statistical method such as maximum likelihood estimation. Information on the color filters may then be used to form an output image.

According to a first aspect, there is provided a method for adapting an image processing system, comprising receiving binary pixel values, the binary pixel values having been formed with binary pixels with color filters by applying light, receiving information on the color of the light, forming an estimate of a color of the color filter of a first pixel by using the binary pixel values and the information on the color of the light, and adapting information on color filters in the image processing system using the estimate.

According to an embodiment, the method further comprises exposing the binary pixels to light through color filters superimposed on the binary pixels, the light having passed through an optical arrangement, and forming the binary pixel values from the output of the binary pixels. According to an embodiment, the method further comprises forming the estimate using likelihood estimation, and refining the estimate iteratively. According to an embodiment, the method further comprises determining neighborhoods of the binary pixels, and using estimated values of pixels in the neighborhood of the first pixel information in forming the estimate for the first pixel. According to an embodiment, the method further comprises forming the estimate by optimizing an energy function having a first component indicative of similarity of the color of the color filter and the color of the light and a second component indicative of at least one difference in values of the first pixel and a neighbor of the first pixel. According to an embodiment, the adjusting is performed in the image processing system to form initial values of the color filters of the binary pixels or to calibrate the values of the color filters of the binary pixels.

According to a second aspect, there is provided an apparatus comprising at least one processor, memory including computer program code, the memory and the computer program code configured to, with the at least one processor, cause the apparatus to receive binary pixel values, the binary pixel values having been formed with binary pixels with color filters by applying light, receive information on the color of the light, form an estimate of a color of the color filter of a first pixel by using the binary pixel values and the information on the color of the light, and adapt information on color filters in the image processing system using the estimate.

According to an embodiment, the apparatus further comprises computer program code configured to, with the processor, cause the apparatus to expose the binary pixels to light through color filters superimposed on the binary pixels, the light having passed through an optical arrangement, and form the binary pixel values from the output of the binary pixels. According to an embodiment, the apparatus further comprises computer program code configured to, with the processor, cause the apparatus to form the estimate using likelihood estimation, and refine the estimate iteratively. According to an embodiment, the apparatus further comprises computer program code configured to, with the processor, cause the apparatus to determine neighborhoods of the binary pixels, and use estimated values of pixels in the neighborhood of the first pixel information in forming the estimate for the first pixel. According to an embodiment, the apparatus further comprises computer program code configured to, with the processor, cause the apparatus to form the estimate by optimizing an energy function having a first component indicative of similarity of the color of the color filter and the color of the light and a second component indicative of at least one difference in values of the first pixel and a neighbor of the first pixel. According to an embodiment, the apparatus further comprises computer program code configured to, with the processor, cause the apparatus to adjust the image processing system to form initial values of the color filters of the binary pixels or to calibrate the values of the color filters of the binary pixels. According to an embodiment, the apparatus further comprises a color signal unit comprising at least one the neural network, and a memory for storing parameters and/or weights of at least one the neural network. According to an embodiment, the apparatus further comprises an optical arrangement for forming an image, an array of binary pixels for detecting the image, and groups of the binary pixels. According to an embodiment, the apparatus further comprises at least one color filter superimposed on an array of binary pixels, the color filter being superimposed on the array of binary pixels in a manner that is a non-aligned, irregular, random, and/or unknown superimposition.

According to a third aspect, there is provided a system comprising at least one processor, memory including computer program code, the memory and the computer program code configured to, with the at least one processor, cause the system to receive binary pixel values, the binary pixel values having been formed with binary pixels with color filters by applying light, receive information on the color of the light, form an estimate of a color of the color filter of a first pixel by using the binary pixel values and the information on the color of the light, and adapt information on color filters in the image processing system using the estimate. According to an embodiment, the system comprises an adjusting unit configured to receive the binary pixel values and the information on the color of the light, and to form an estimate of a color of the color filter of a first pixel by using the binary pixel values and the information on the color of the light, and an image processing unit comprising a binary pixel array with color filters and configured to form images, wherein the image processing unit is configured to receive adjustment information from the adjusting unit for adapting the image processing unit.

According to a fourth aspect, there is provided a computer program product stored on a computer readable medium and executable in a data processing device, wherein the computer program product comprises a computer program code section for receiving binary pixel values, the binary pixel values having been formed with binary pixels with color filters by applying light, a computer program code section for receiving information on the color of the light, a computer program code section for forming an estimate of a color of the color filter of a first pixel by using the binary pixel values and the information on the color of the light, and a computer program code section for adapting information on color filters in the image processing system using the estimate. According to an embodiment, the computer program product further comprises a computer program code section for adjusting the image processing system to form initial values of the color filters of the binary pixels or to calibrate the values of the color filters of the binary pixels.

According to a fifth aspect there is provided an apparatus comprising processing means, memory means, means for receiving binary pixel values, the binary pixel values having been formed with binary pixels with color filters by applying light, means for receiving information on the color of the light, means for forming an estimate of a color of the color filter of a first pixel by using the binary pixel values and the information on the color of the light, and means for adapting information on color filters in the image processing system using the estimate.

DESCRIPTION OF THE DRAWINGS

In the following, various embodiments of the invention will be described in more detail with reference to the appended drawings, in which.

DESCRIPTION OF EXAMPLE EMBODIMENTS

In the following, several embodiments of the invention will be described in the context of a binary pixel array. It is to be noted, however, that the invention is not limited to binary pixel arrays. In fact, the different example embodiments have applications widely in any environment where mapping of input pixel values to output pixel values through a partly uncertain process is exploited.

Figure 1A:
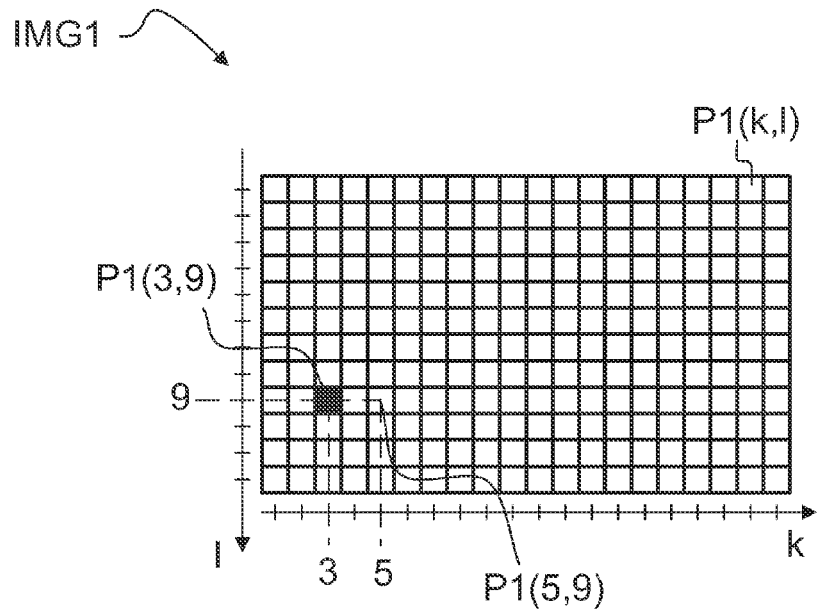
FIG. 1a shows a binary image.

Referring to FIG. 1a, the image sensor applied in the example embodiments may be a binary image sensor arranged to provide a binary image IMG1. The image sensor may comprise a two-dimensional array of light detectors such that the output of each light detector has only two logical states. Said logical states are herein called as the "black" state and the "white" state. The image sensor may be initialized such that all detectors may be initially at the black state. An individual detector may be switched into the white state by exposing it to light. Thus, a binary image IMG1 provided by the image sensor may consist of pixels P1, which are either in the black state or in the white state, respectively. The expressions "white pixel" and "the pixel is white" refer to a pixel which is in the white state. The expression "black pixel" refers to a pixel which is in the black state, respectively. These expressions are not indicative of the color of the pixel, they merely describe whether the pixel has been activated (white state or "lit") due to light or whether it remains inactive (black state or "unlit").

The pixels P1 may be arranged in rows and columns, i.e. the position of each pixel P1 of an input image IMG1 may be defined by an index k of the respective column and the index l of the respective row. For example, the pixel P1(3,9) shown in FIG. 1a is black and the pixel P1(5,9) is white.

A binary light detector may be implemented e.g. by providing a conventional (proportional) light detector which has a very high conversion gain (low capacitance). Other possible approaches include using avalanche or impact ionization to provide in-pixel gain, or the use of quantum dots.

Figure 1B:
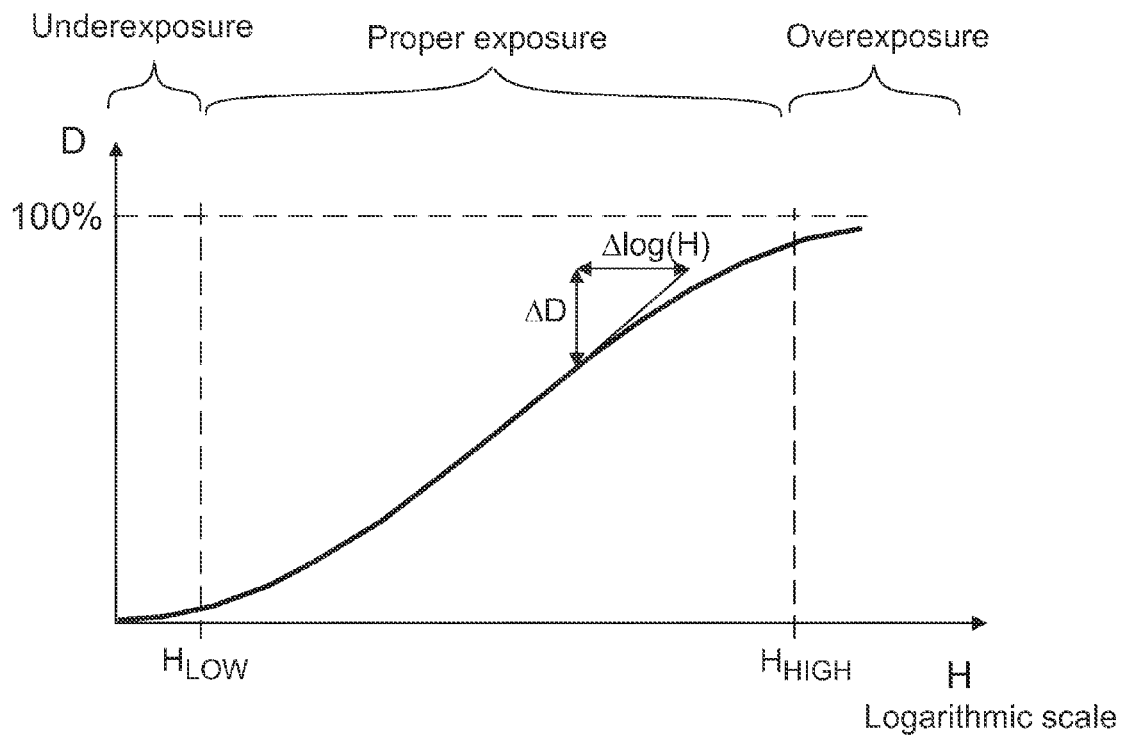
FIG. 1b shows a density of white pixels as a function of exposure.

FIG. 1b shows an estimate for the density D of white pixels P1 as a function of optical exposure H. The exposure H is presented in a logarithmic scale. The density D means the ratio of the number of white pixels P1 within a portion of the image IMG1 to the total number of pixels P1 within said portion. A density value 100% means that all pixels within the portion are in the white state. A density value 0% means that all pixels within the portion are in the black state. The optical exposure H is proportional to the optical intensity and the exposure time. The density D is 0% at zero exposure H. The density increases with increasing exposure until the density begins to saturate near the upper limit 100%.

The conversion of a predetermined pixel P1 from black to white is a stochastic phenomenon. The actual density of white pixels P1 within the portion of the image IMG1 follows the curve of FIG. 1b when said portion contains a high number of pixels P1.

Figure 3A:
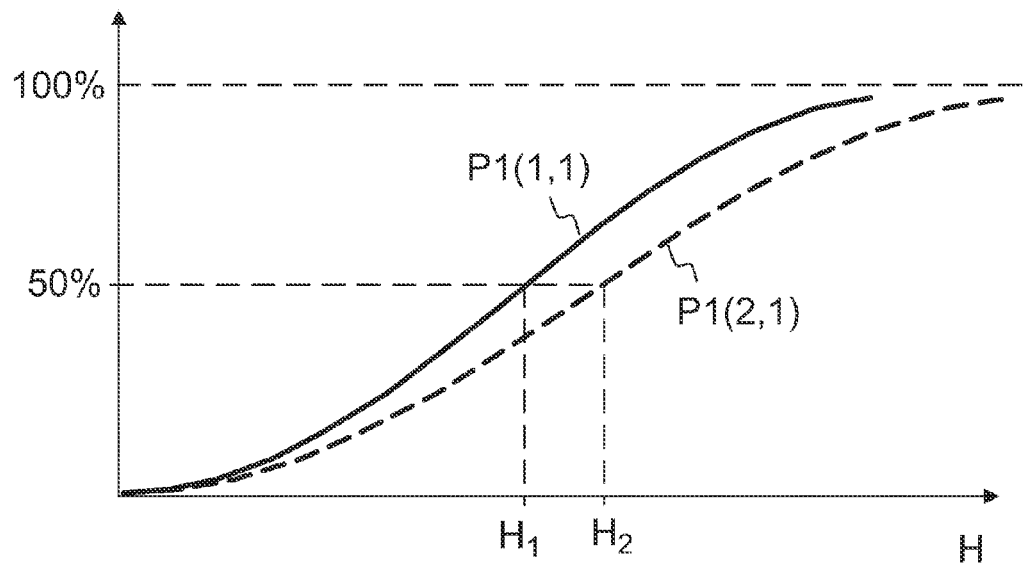
FIG. 3a shows probability of white state for a single pixel.
Figure 3B:
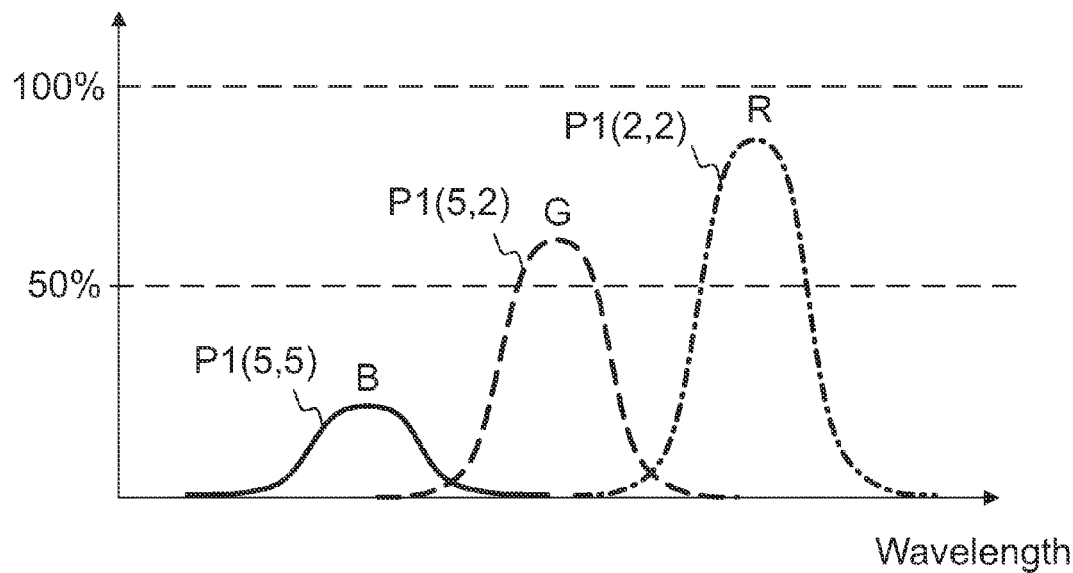
FIG. 3b shows dependence of white state probability on wavelength.

In case of individual pixels, the curve of FIG. 1b may also be interpreted to represent the probability for a situation where the state of a predetermined pixel P1 is converted from the black state to the white state after a predetermined optical exposure H (see also FIGS. 3a and 3b).

An input image IMG1 is properly exposed when the slope $\Delta D/\Delta \log(H)$ of the exposure curve is sufficiently high (greater than or equal to a predetermined value). Typically, this condition is attained when the exposure H is greater than or equal to a first predetermined limit HLOW and smaller than or equal to a second predetermined limit HHIGH. Consequently the input image may be underexposed when the exposure H is smaller than the first predetermined limit HLOW, and the input image may be overexposed when the exposure H is greater than the second predetermined limit HHIGH.

The signal-to-noise ratio of the input image IMG1 or the signal-to-noise ratio of a smaller portion of the input image IMG1 may be unacceptably low when the exposure H is smaller than the first limit HLOW or greater than the second limit HHIGH. In those cases it may be acceptable to reduce the effective spatial resolution in order to increase the signal-to-noise ratio.

The exposure state of a portion of a binary image depends on the density of white and/or black pixels within said portion. Thus, the exposure state of a portion of the input image IMG1 may be estimated e.g. based on the density of white pixels P1 within said portion. The density of white pixels in a portion of an image depends on the density of black pixels within said portion.

The exposure state of a portion of the input image IMG1 may also be determined e.g. by using a further input image IMG1 previously captured by the same image sensor. The exposure state of a portion of the input image IMG1 may also be estimated e.g. by using a further image captured by a further image sensor.

The further image sensor which can be used for determining the exposure state may also be an analog sensor. The analog image sensor comprises individual light detectors, which are arranged to provide different grey levels, in addition to the black and white color. Different portions of an image captured by an analog image sensor may also be determined to be underexposed, properly exposed, or overexposed. For example, when the brightness value of substantially all pixels in a portion of an image captured by an analog image sensor are greater than 90%, the image portion may be classified to be overexposed. For example, when the brightness value of substantially all pixels in a portion of an image captured by an analog image sensor are smaller than 10%, the image portion may be classified to be underexposed. When a considerable fraction of pixels have brightness values in the range of 10% to 90%, then the image portion may be properly exposed, respectively.

Figure 2A:
FIG. 2a shows a grey-scale image of a girl.
Figure 2B:
FIG. 2b shows a binary image of a girl.

FIG. 2a shows, by way of example, an image of a girl in grey scale. FIG. 2b shows a binary image corresponding to the image of FIG. 2a. The image of FIG. 2b has a large pixel size in order to emphasize the black and white pixel structure. In reality, binary pixels that make up the image of FIG. 2b are often smaller than the output pixels that make up the image of FIG. 2a. Several binary pixels of FIG. 2b may correspond to one grey-scale pixel of FIG. 2a. The density of binary pixels in the white state in FIG. 2b may have a correspondence to the grey scale brightness of a grey-scale pixel in FIG. 2a.

FIG. 3a shows probability of exposure or state changing for a single binary pixel, i.e. the probability that the state of a single predetermined pixel is changed from the black state to the white state. In FIG. 1b, the density of white pixels compared to black pixels as a function of intensity H was shown. Correspondingly, with reference to FIG. 3a, a pixel has a probability of being in a white state, and this probability is a function of intensity. For example, the pixel P1(1,1) has a 50% probability of being in the white state when the optical exposure is $H_1$ and the pixel P1(2,1) has a 50% probability of being in the white state when the optical exposure is $H_2$. As mentioned above, the optical exposure H is proportional to the optical intensity and the exposure time. Different pixels may have different probability curves, i.e. they may have a different probability of being in the white state with the same intensity H of incoming light.

FIG. 3b shows state changing probability for a single binary pixel as a function of wavelength of light impinging on a combination of a color filter and the binary pixel. In FIG. 3b, it is assumed that various binary pixels may have a color filter imposed on top of them so that a certain color band of incoming light is able to pass trough. In such an arrangement, different binary pixels may have a different probability of being in the white state when they are exposed to light that has the same intensity but different wavelength (color).

For example, in FIG. 3b the pixel P1(5,5) is responsive to light that has a wavelength corresponding essentially to the blue color. When the wavelength of the incoming light deviates from the blue color, the pixel P1(5,5) has a lower probability of being in the exposed (white) state. Likewise, the pixel P1(5,2) is responsive to light that has a wavelength corresponding essentially to the green color, and the pixel P1(2,2) is responsive to light that has a wavelength corresponding essentially to the red color.

The color filters on top of the binary pixels may seek to act as band-pass filters whereby the underlying pixels are responsive only to light in a certain color band, e.g. red, green or blue or any other color or wavelength. However, the color filters may be imperfect either intentionally or by chance, and the band-pass filter may "leak" so that other colors are let through, as well.

The probability of a pixel being exposed as a function of wavelength may not be a regularly-shaped function like the bell-shaped functions in FIG. 3b for a blue pixel (solid line), green pixel (dashed line) and red pixel (dash-dot line). Indeed, the probability function may be irregular, it may have several maxima, and it may have a fat tail (i.e. a long tail which has a non-negligible magnitude) so that the probability of e.g. a red pixel being exposed with blue light is not essentially zero, but may be e.g. 3%, 10% or 30% or even more.

The state-changing probability functions of pixels of different color may be essentially non-overlapping, as in the case of FIG. 3b, so that light of single color has a probability of exposing pixels of essentially the same color, but not others. The state-changing probability functions may also be overlapping so that light between red and green wavelengths has a significant probability of exposing both red pixel P1(2, 2) and green pixel P1(5,2). The state-changing probability functions may also vary from pixel to pixel.

Figure 4:
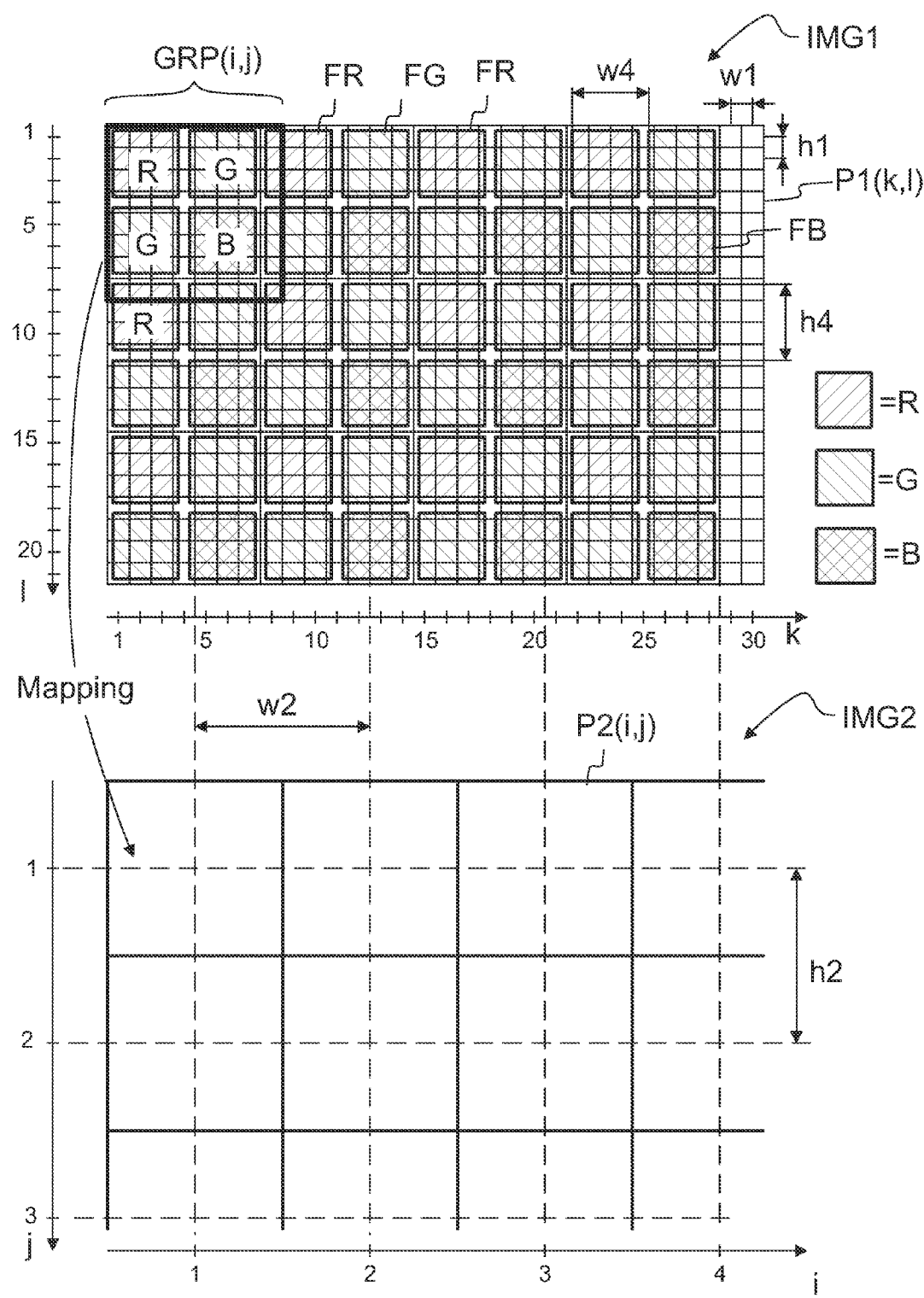
FIG. 4 shows a Bayer matrix type color filter on top of a binary pixel array for capturing color information.

FIG. 4 shows a Bayer matrix type color filter on top of a binary pixel array for forming output pixels. The pixel coordinates of the binary pixels P1 (k,l) in FIG. 4 correspond to FIG. 3b and create an input image IMG1. A Bayer matrix is an arrangement with color filters, which are placed on top of light sensors in a regular layout, where every second filter is green, and every second filter is red or blue in an alternating manner. Therefore, as shown in FIG. 4, essentially 50% of the filters are green (shown with downward diagonal texture), essentially 25% are red (shown with upward diagonal texture) and essentially 25% are blue (shown with cross pattern texture). In an setup where a Bayer matrix is placed on top of a binary pixel array, individual color filters FR, FG and FB may overlap a single binary pixel, or a plurality of binary pixels, for example 4 binary pixels, 9.5 binary pixels, 20.7 binary pixels, 100 binary pixels, 1000 binary pixels or even more. If the distance between the centers of the binary input pixels is w1 in width and h1 in height, the distance between centers of individual Bayer matrix filters may be w4 in width and h4 in height, whereby w4>w1 and h4>h1. Thus the filters may overlap several binary pixels. The individual filters may be tightly spaced, they may have a gap in between (leaving an area in between that lets through all colors) or they may overlap each other. The filters may be square-shaped, rectangular, hexagonal or any other shape.

The binary pixels of image IMG1 may form groups GRP(i,j) corresponding to pixels P2(i,j) of the output image IMG2. In this manner, a mapping between the binary input image IMG1 and the output image IMG2 may be formed. The groups GRP(i,j) may comprise binary pixels that have color filters of different colors. The groups may be of the same size, or they may be of different sizes. The groups may be shaped regularly or they may have an irregular shape. The groups may overlap each other, they may be adjacent to each other or they may have gaps in between groups. In FIG. 4, as an example, the group GRP(1,1) corresponding to pixel P2(1,1) of image IMG2 overlaps 64 (8×8) binary pixels of image IMG1, that is, group GRP(1,1) comprises the pixels P1(1,1)-P1(8,8). The boundaries of the groups GRP(I,j) may coincide with boundaries of the color filters FR, FG, FB, but this is not necessary. The group boundaries may also be displaced and/or misaligned with respect to the boundaries of the Bayer matrix filters. In this manner, the groups GRP(i,j) of image IMG1 may be used to form pixels P2(i,j) in image IMG2. The distance between the centers of the pixels P2(i,j) may be w2 in width and h2 in height The output pixels P2 may have a size of w2 and h2, respectively, or they may be smaller or larger.

Figure 5:
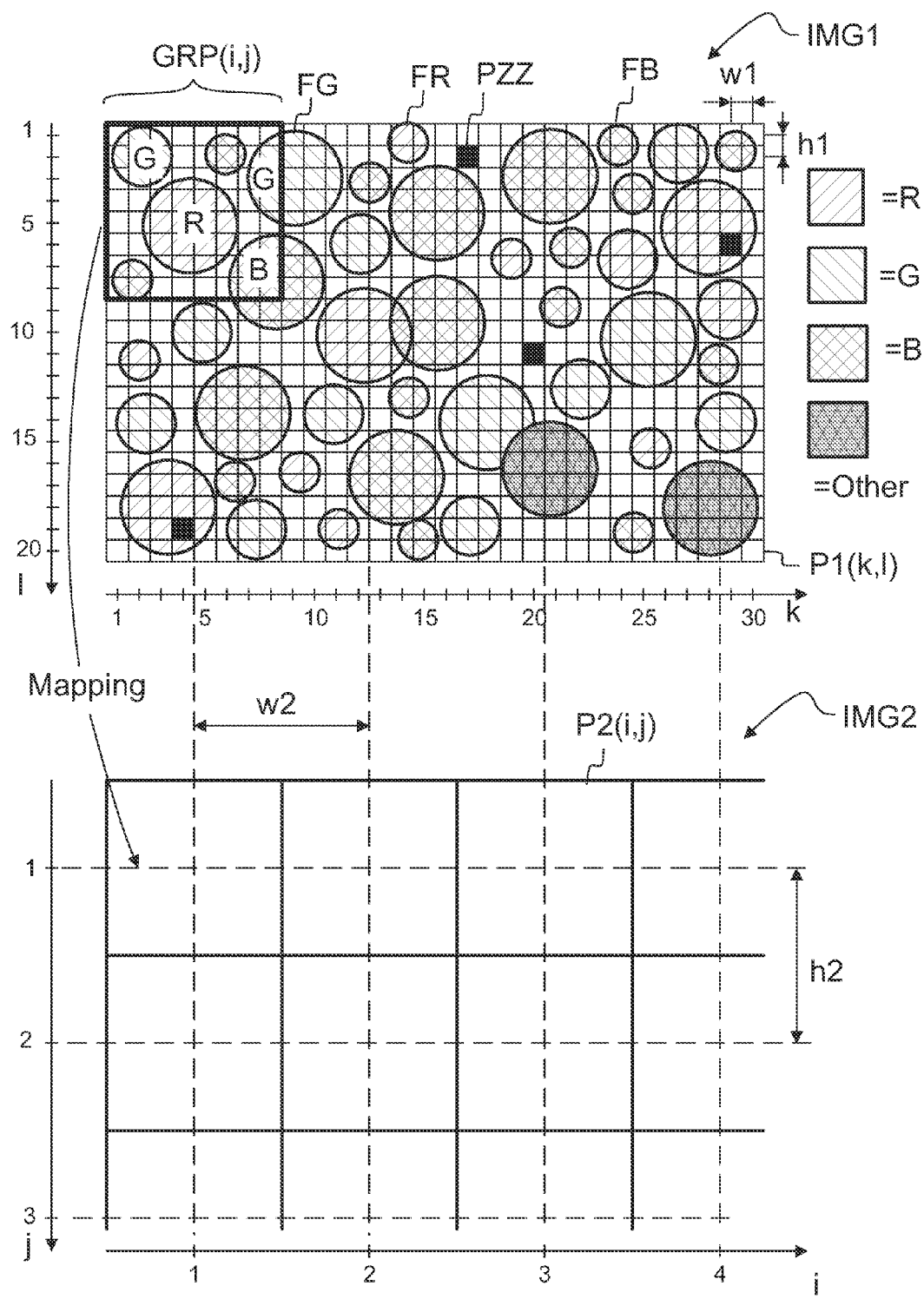
FIG. 5 shows a random color filter on top of a binary pixel array for forming output pixels.

FIG. 5 shows a random color filter on top of a binary pixel array for forming output pixels. As with FIG. 4, the image IMG1 comprises binary pixels P1(k,l) that may be grouped to groups GRP(i,j), the groups corresponding to pixels P2(i,j) in image IMG2, and the setup of the images IMG1 and IMG2 are the same as in FIG. 4. However, in contrast to FIG. 4, the color filters FG, FR and FB of FIG. 5 are not regularly shaped or arranged in a regular arrangement. The color filters may have different sizes, and may be placed on top of the binary pixels in a random manner. The color filters may be spaced apart from each other, they may be adjacent to each other or they may overlap each other. The color filters may leave space in between the color filters that lets through all colors or wavelengths of light, or alternatively, does not essentially let through light at all. Some of the pixels P1(k,l) may be non-functioning pixels PZZ that are permanently jammed to the white (exposed) state, or the black (unexposed) state, or that otherwise give out an erroneous signal that is not well dependent on the incoming intensity of light. The pixels P1(k,l) may have different probability functions for being in the white state as a function of intensity of incoming light. The pixels P1(k,l) may have different probability functions for being in the white state as a function of wavelength of incoming light. These properties may be due to imperfections of the pixels themselves or imperfections of the overlaying color filters. For example, the color filters may have a color Other different from red, green and blue.

With an arrangement like shown in FIG. 5, a group GRP(i,j) may comprise a varying number of binary pixels that have a green G filter, a red R filter or a blue B filter. Furthermore, the different red, green and blue binary pixels may be placed differently in different groups GRP(i,j). The average number of red, green and blue pixels and pixels without a filter may be essentially the same across the groups GRP(i,j), or the average number (density) of red, green and blue pixels and pixels without a filter may vary across groups GRP(i,j) according to a known or unknown distribution.

Figure 6:
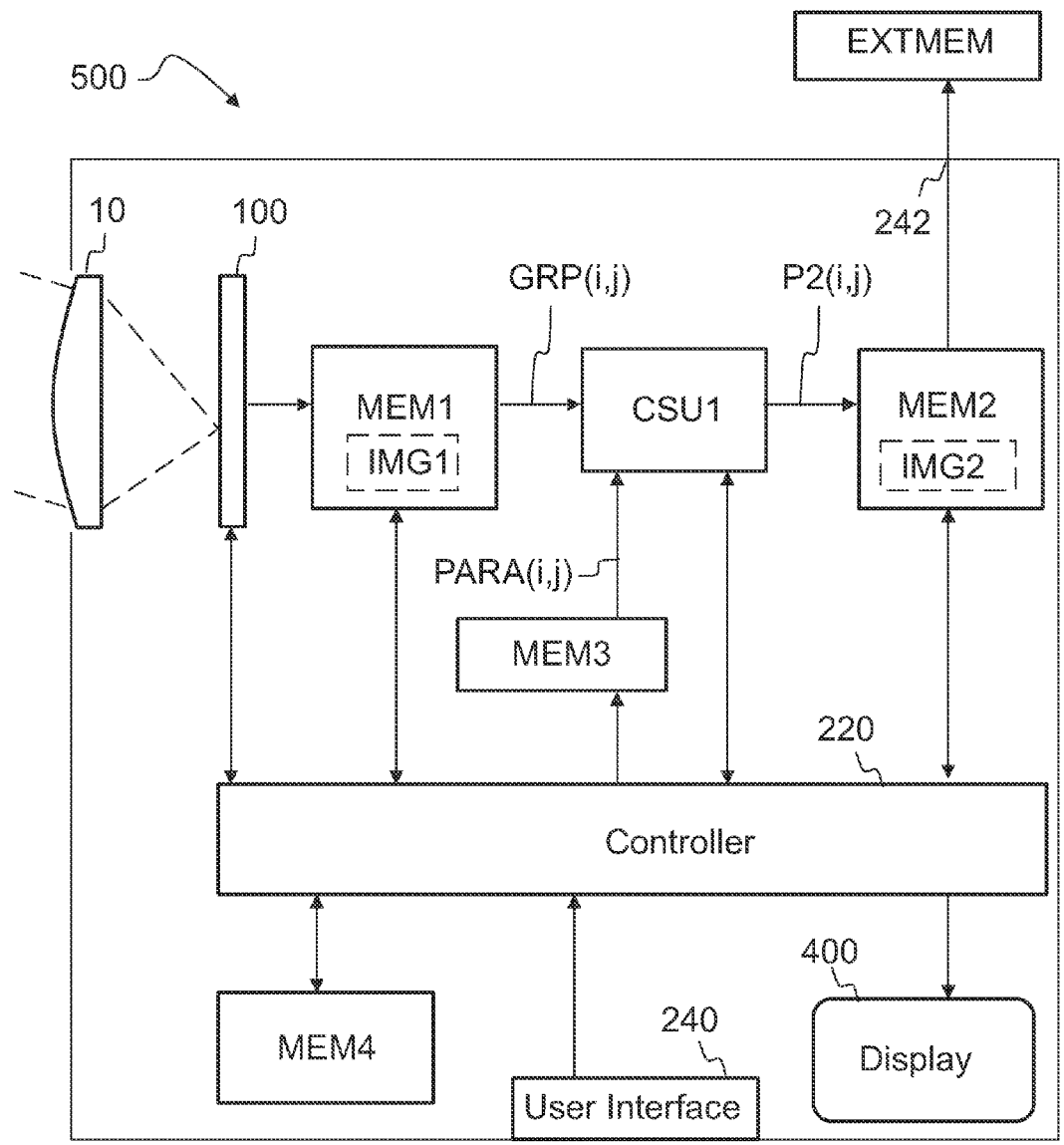
FIG. 6 shows a block diagram of an imaging device.

FIG. 6 shows a block diagram of an imaging device. Referring to FIG. 6, an imaging device 500 may comprise imaging optics 10 and an image sensor 100 for capturing a binary digital input image IMG1 of an object, and a signal processing unit (i.e. a Color Signal Unit) CSU1 arranged to provide an output image IMG2 based on an input image IMG1. The imaging optics 10 may be e.g. a focusing lens. The input image IMG1 may depict an object, e.g. a landscape, a human face, or an animal. The output image IMG2 may depict the same object but at a lower spatial resolution or pixel density.

The image sensor 100 may be binary image sensor comprising a two-dimensional array of light detectors. The detectors may be arranged e.g. in more than 10000 columns and in more than 10000 rows. The image sensor 100 may comprise e.g. more than $10^9$ individual light detectors. An input image IMG1 captured by the image sensor 100 may comprise pixels arranged e.g. in 41472 columns and 31104 rows. (image data size $1.3 \cdot 10^9$ bits, i.e. 1.3 gigabits or 160 megabytes). The corresponding output image IMG2 may have a lower resolution. For example, the corresponding output image IMG2 may comprise pixels arranged e.g. in 2592 columns and 1944 rows (image data size of approximately $5 \cdot 10^6$ pixels, 8 bits per pixel for each color R,G,B, total data size $1.2 \cdot 10^8$ bits, i.e. approximately 120 megabits or 15 megabytes). Thus, the image size may be reduced e.g. by a factor of 10 ($=1.3 \cdot 10^9/1.2 \cdot 10^8$).

The data size of a binary input image IMG1 may be e.g. greater than or equal to 4 times the data size of a corresponding output image IMG2, wherein the data sizes may be indicated e.g. in the total number of bits needed to describe the image information. If higher data reduction is needed, the data size of the input image IMG1 may be greater than 10, greater than 20, greater than 50 times or even greater than 100 or 1000 times the data size of a corresponding output image IMG2.

The imaging device 500 may comprise an input memory MEM1, an output memory MEM2 to store output images IMG2, a memory MEM3 for storing data related to image processing such as neural network coefficients or weights or other data, an operational memory MEM4 for example to store computer program code for the data processing algorithms and other programs and data, a display 400, a controller 220 to control the operation of the imaging device 500, and an user interface 240 to receive commands from a user.

The input memory MEM1 may at least temporarily store at least a few rows or columns of the pixels P1 of the input image IMG1. Thus, the input memory may be arranged to store at least a part of the input image IMG1, or it may be arranged to store the whole input image IMG1. The input memory MEM1 may be arranged to reside in the same module as the image sensor 100, for example so that each pixel of the image sensor may have one, two or more memory locations operatively connected to the image sensor pixels for storing the data recorded by the image sensor.

The signal processor CSU1 may be arranged to process the pixel values IMG1 captured by the image sensor 100. The processing may happen e.g. using a neural network or other means, and coefficients or weights from memory MEM3 may be used in processing. The signal processor CSU1 may store its output data, e.g. an output image IMG2 to MEM2 or to MEM3 (not shown in picture). The signal processor CSU1 may function independently or it may be controlled by the controller 220, e.g. a general purpose processor. Output image data may be transmitted from the signal processing unit 200 and/or from the output memory MEM2 to an external memory EXTMEM via a data bus 242. The information may be sent e.g. via internet and/or via a mobile telephone network.

The memories MEM1, MEM2, MEM3, and/or MEM4 may be physically located in the same memory unit. For example, the memories MEM1, MEM1, MEM2, MEM3, and/or MEM4 may be allocated memory areas in the same component. The memories MEM1, MEM2, MEM3, MEM4, and/or MEM5 may also be physically located in connection with the respective processing unit, e.g. so that memory MEM1 is located in connection with the image sensor 100, memory MEM3 is located in connection with the signal processor CSU1, and memories MEM3 and MEM4 are located in connection with the controller 220.

The imaging device 500 may further comprise a display 400 for displaying the output images IMG2. Also the input images IMG1 may be displayed. However, as the size of the input image IMG1 may be very large, it may be so that only a small portion of the input image IMG1 can be displayed at a time at full resolution. The user of the imaging device 500 may use the interface 240 e.g. for selecting an image capturing mode, exposure time, optical zoom (i.e. optical magnification), digital zoom (i.e. cropping of digital image), and/or resolution of an output image IMG2.

The imaging device 500 may be any device with an image sensor, for example a digital still image or video camera, a portable or fixed electronic device like a mobile phone, a laptop computer or a desktop computer, a video camera, a television or a screen, a microscope, a telescope, a car or a, motorbike, a plane, a helicopter, a satellite, a ship or an implant like an eye implant. The imaging device 500 may also be a module for use in any of the above mentioned apparatuses, whereby the imaging device 500 is operatively connected to the apparatus e.g. by means of a wired or wireless connection, or an optical connection, in a fixed or detachable manner.

The device 500 may also omit having an image sensor. It may be feasible to store outputs of binary pixels from another device, and merely process the binary image IMG1 in the device 500. For example, a digital camera may store the binary pixels in raw format for later processing. The raw format image IMG1 may then be processed in device 500 immediately or at a later time. The device 500 may therefore be any device that has means for processing the binary image IMG1. For example, the device 500 may be a mobile phone, a laptop computer or a desktop computer, a video camera, a television or a screen, a microscope, a telescope, a car or a motorbike, a plane, a helicopter, a satellite, a ship, or an implant like an eye implant. The device 500 may also be a module for use in any of the above mentioned apparatuses, whereby the imaging device 500 is operatively connected to the apparatus e.g. by means of a wired or wireless connection, or an optical connection, in a fixed or detachable manner. The device 500 may be implemented as a computer program product that comprises computer program code for determining the output image from the raw image. The device 500 may also be implemented as a service, wherein the various parts and the processing capabilities reside in a network. The service may be able to process raw or binary images IMG1 to form output images IMG2 to the user of the service. The processing may also be distributed among several devices.

The control unit 220 may be arranged to control the operation of the imaging device 500. The control unit 220 may be arranged to send signals to the image sensor 100 e.g. in order to set the exposure time, in order to start an exposure, and/or in order to reset the pixels of the image sensor 100.

The control unit 220 may be arranged to send signals to the imaging optics 10 e.g. for performing focusing, for optical zooming, and/or for adjusting optical aperture.

Thanks to image processing according to the present invention, the output memory MEM2 and/or the external memory EXTMEM may store a greater number of output images IMG2 than without said image processing. Alternatively or in addition, the size of the memory MEM2 and/or EXTMEM may be smaller than without said image processing. Also the data transmission rate via the data bus 242 may be lowered. These advantages may be achieved without visible loss in image resolution due to the processing in the signal processor CSU1.

Figure 7:
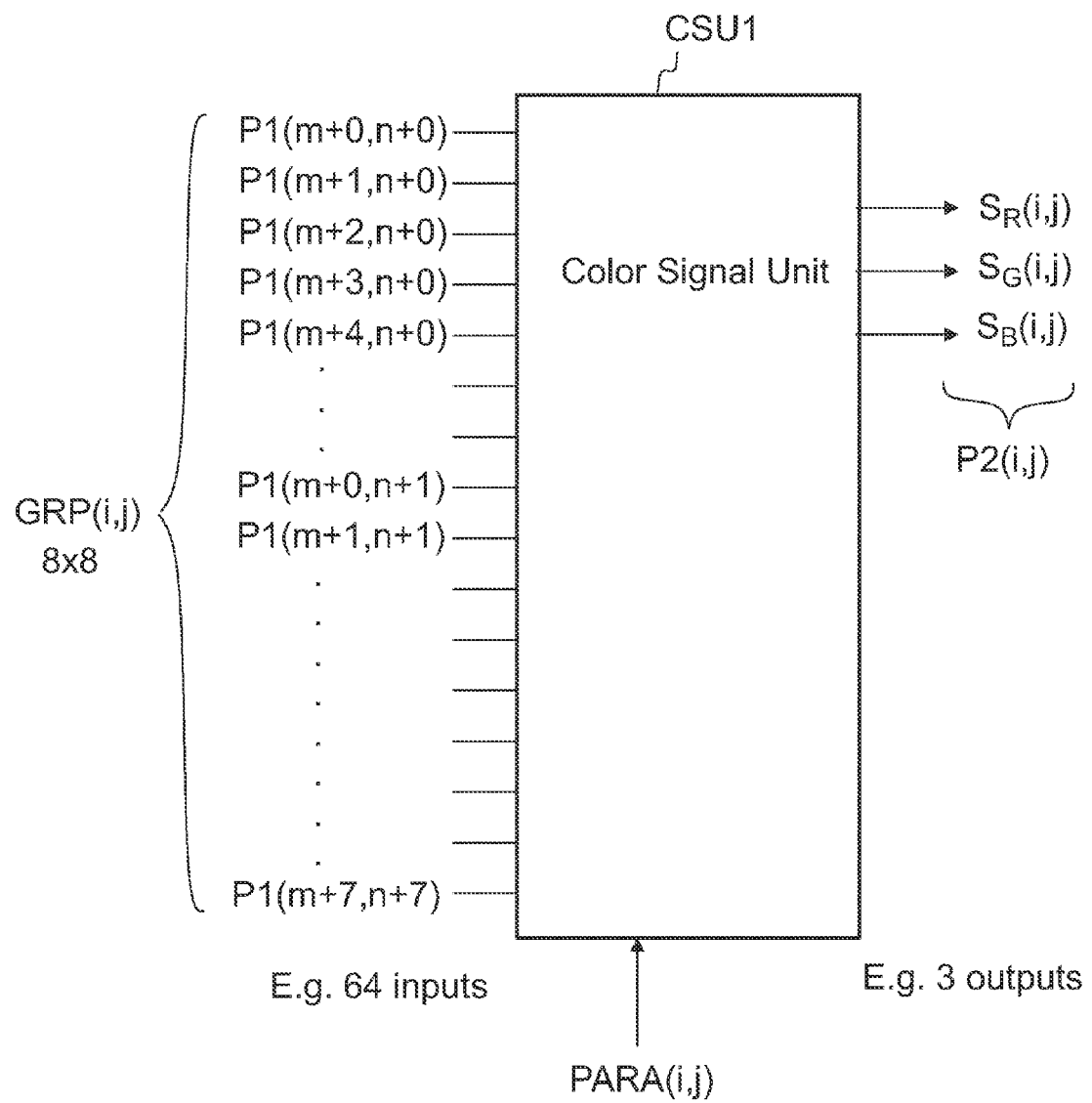
FIG. 7 shows a color signal unit for forming output pixels from binary pixels.

FIG. 7 shows a color signal unit CSU1 for forming output pixels from binary pixels. The color signal unit or signal processor CSU1 may have a large number of inputs, e.g. 16, 35, 47, 64, 280, 1400, 4096, 10000 or more, corresponding to pixels P1 in the input image IMG1. For example, the inputs may correspond to the binary pixels of groups GRP(i,j) and be binary values from pixels P1($m$+0,n+0) to P1($m$+7,n+7), the binary values indicating whether the corresponding pixel has been exposed or not (being in the white or black state, correspondingly). In FIG. 7, the indices m and n may specify the coordinates of the upper left corner of an input pixel group GRP(i,j), which is fed to the inputs of the color signal unit CSU1. For example, when processing the group GRP(1,1), in order to calculate the color values for the output pixel P2(1,1), the values (i.e. states) of the input pixels P1(1,1), P1(2,1), P1(3,1) . . . P1(6,8), P1(7,8), and P1(8,8) may be fed to 64 different inputs of the color signal unit CSU1.

The color signal unit or signal processor CSU1 may take other data as input, for example data PARA(i,j) related to processing of the group GRP(i,j) or general data related to processing of all or some groups. It may use these data PARA by combining these data to the input values P1, or the data PARA may be used to control the operational parameters of the color signal unit CSU1. The color signal unit may have e.g. 3 outputs or any other number of outputs. The color values of an output pixel P2($i,j$) may be specified by determining e.g. three different output signals $S_R$(i,j) for the red color component, $S_G$(i,j) for the green color component, and $S_B$(i,j) for the blue color component. The outputs may correspond to output pixels P2($i,j$), for example, the outputs may be the color values red, green and blue of the output pixel. The color signal unit CSU1 may correspond to one output pixel, or a larger number of output pixels.

The color signal unit CSU1 may also provide output signals, which correspond to a different color system than the RGB-system. For example, the output signals may specify color values for a CMYK-system (Cyan, Magenta, Yellow, Key color), or YUV-system (luma, 1st chrominance, 2nd chrominance). The output signals and the color filters may correspond to the same color system or a different color systems. Thus, the color signal unit CSU1 may also comprise a calculation module for providing conversion from a first color system to a second color system. For example, the image sensor 100 may be covered with red, green and blue filters (RGB system), but the color signal unit CSU1 may provide three output signals according to the YUV-system.

The color signal unit CSU1 may provide two, three, four, or more different color signals for each output pixel P2.

Figure 8:
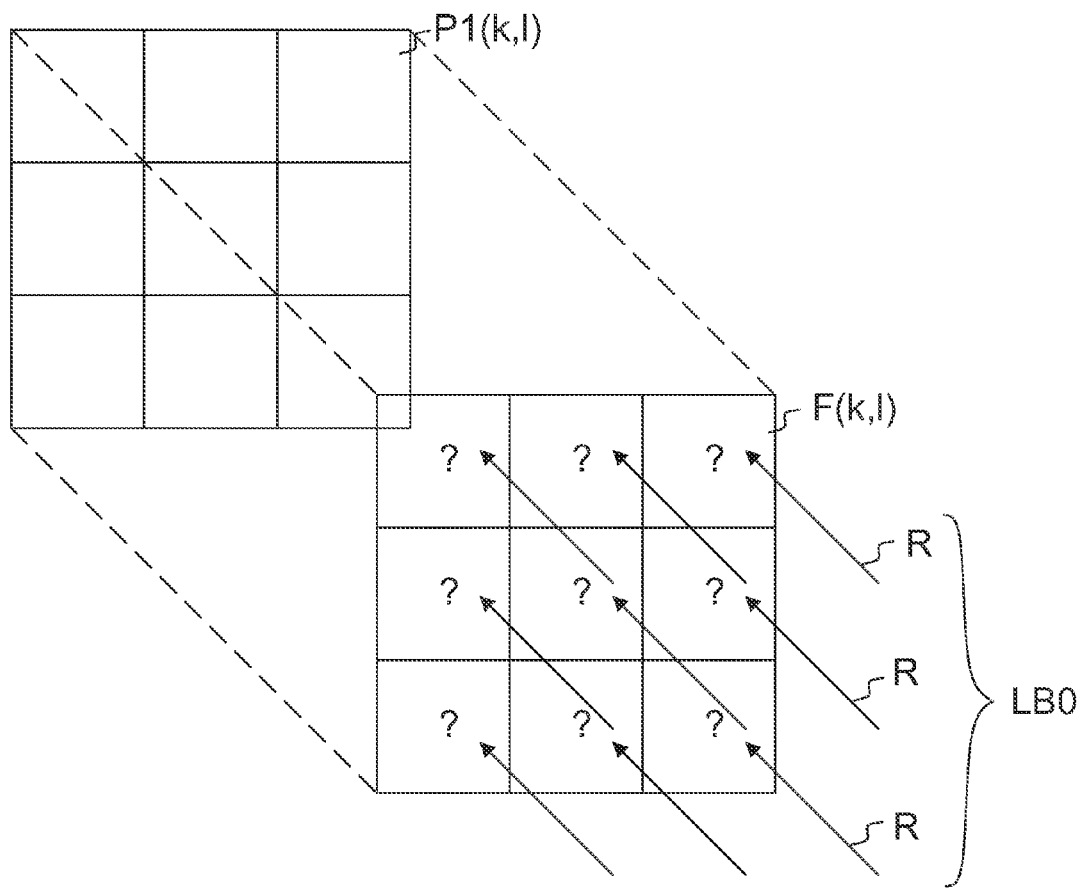
FIG. 8 shows an arrangement for determining a color filter layout overlaying a binary pixel array.

FIG. 8 shows an arrangement for determining a color filter layout overlaying a binary pixel array. The probability of changing state for the binary pixels P1($k,l$) may be a function of the intensity of incoming light, as explained earlier in the context of FIGS. 3$a$ and 3$b$. Further, the binary pixels P1($k,l$) may have a color filter F(k,l) on top of the binary pixel, as explained in the context of FIGS. 4 and 5. Due to the irregular shape and size of the color filters and/or due to unknown alignment of the color filter array with the binary pixel array, the color of the filter F(k,l) (or colors of the filters) on top of the binary pixel P1($k,l$) may not be known. The unknown color filter values have been marked with question marks in FIG. 8.

For example, after the color filter array has been manufactured on top of the binary pixel array, it may not be immediately known which Bayer matrix element overlays on top of which binary pixel (as in FIG. 4), or which color filter is on top of which binary pixel in an irregular setup (as in FIG. 5). The color filter array may also be irregular with respect to its colors, i.e. the colors of the filter elements may not be exactly of the color as intended. It might also be possible that the location and the color of the filters may also change over time, e.g. due to mechanical or physical wearing or due to exposure to light.

To determine color values for the color filters F(k,l), a light beam LB0 of known color or a known input image may be applied to the binary pixel array through the color filter array. The output of the binary pixels, i.e. the response of the binary pixels to the known input, may then be used to determine information of the color filter array. For example, pixel array may be exposed several times to different color of input light beams LB0 or different input images. The outputs of the binary pixels may be recorded and processed. For example, the binary pixels P1($k,l$) may be grouped to groups GRP(i,j), as explained in the context of FIGS. 4 and 5, and the information of each group GRP(i,j) may be processed separately. This will be explained later.

Figure 9:
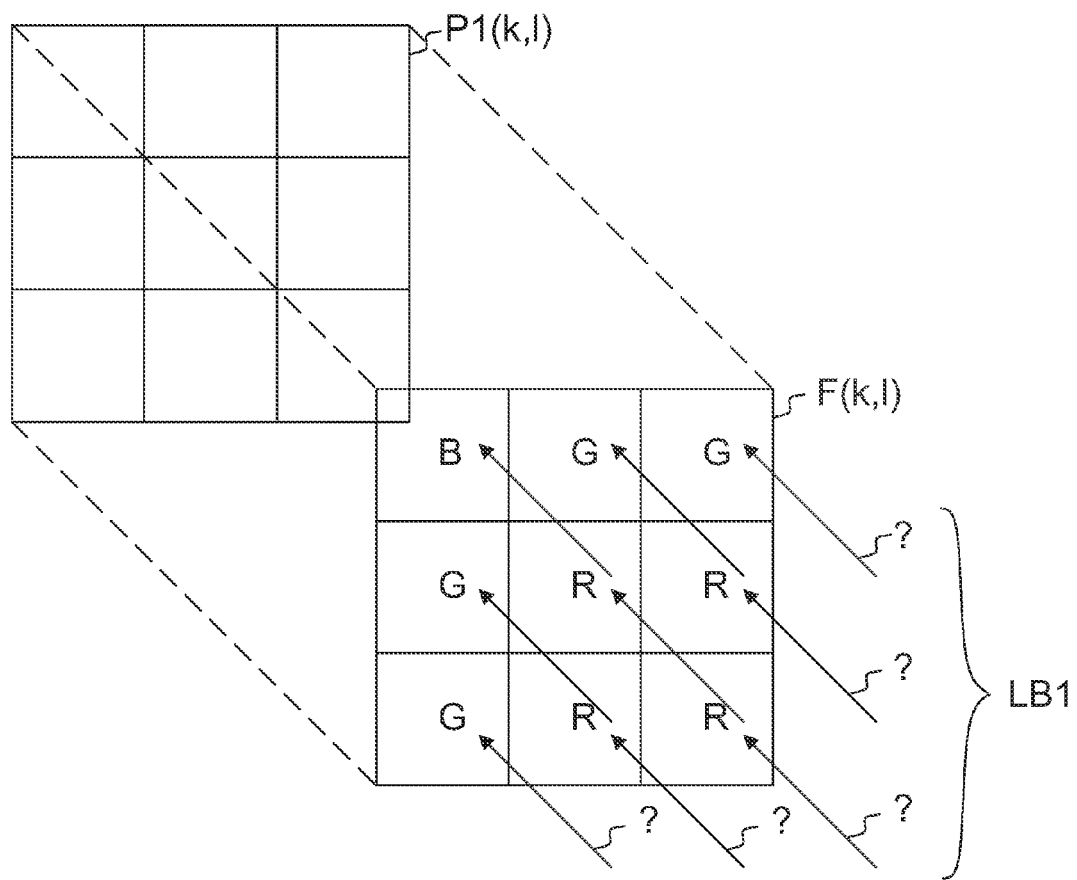
FIG. 9 shows an arrangement for determining color of incoming light with a color filter overlaying a binary pixel array.

FIG. 9 shows an arrangement for determining color of incoming light with a color filter overlaying a binary pixel array. At this point, there exists some information about the color filters F(k,l), for example, the individual color filters may be knows, or the number of different color filters red, green and blue related to the groups GRP(i,j) of binary pixels may be known. It may also be that only a transformation from the binary pixel array P1($k,l$) to the output pixel array P2($i,j$) is known or at least partially known. This information of the color filter array F(k,l) may comprise information on the colors of the filters, information on non-functioning pixels, and/or information on pixels that do not have an associated color filter.

The information on the color filters F(k,l) may now be used to determine information of incoming light LB1. For example, the incoming light may be formed by a lens system, and may therefore form an image on the image sensor 100. When the incoming light passes through the color filters F(k,l) to the binary pixel array P1($k,l$), it causes some of the binary pixels to be exposed (to be in the white state). Because the light LB1 has passed through a colour filter, the image IMG1 formed by the exposed binary pixels has information both on the intensity of light as well as the color of light LB1 hitting each binary pixel. When the image IMG1 is transformed into image IMG2 by using the information about the color filters F(k,l), for example by grouping the binary pixels to groups GRP(i,j) for forming the pixels P2($i,j$) of the image IMG2, the color information may be decoded from the light LB1, and the each pixel of image IMG2 may be assigned a set of brightness values, one brightness value for each color component R, G, B.

In other words, a picture created by the camera optics onto the binary pixel array having superimposed color filters may cause the binary pixels to activate based on the color of light hitting the pixel and the color of the filter F(k,l) on top of the pixel. For example, when blue light hits a blue color filter F(k,l), the intensity of the light may not be diminished very much when it passes through the filter. Therefore, the binary pixel underneath the blue filter may have a high probability of being in the white state (being exposed). On the other hand, when blue light hits a red color filter F(k,l), the intensity of the light may be diminished to a greater degree. Therefore the binary pixel underneath the red filter may have a low probability of being in the white state (being exposed). Consequently, when a larger group of binary pixels GRP(i,j) is exposed to a certain color of light, say blue, more binary pixels having the corresponding color filter (e.g. blue) will be activated to the white state compared to those that have a color filter of another color (red and green). This exposure values (white/black) of the individual binary pixels may be used by a color signal unit CSU1 to form an output image IMG2.

Figure 10A:
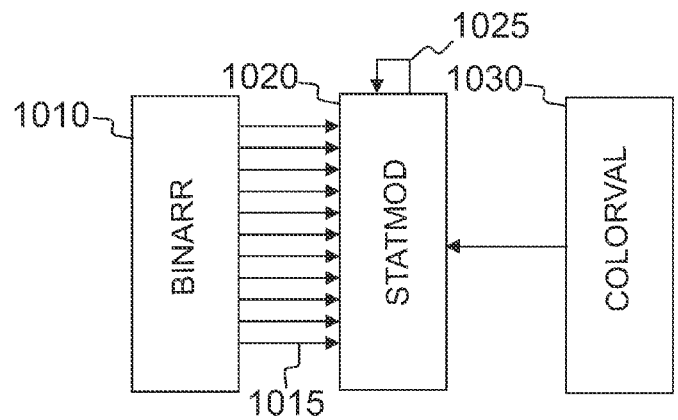
FIG. 10a illustrates the determination of color filter values by a statistical method.

FIG. 10$a$ illustrates the determination of color filter values by a statistical method. In the system, there may have a two-dimensional array BINARR 1010 of binary valued sensors, and on the binary sensors a color filter is superposed. The spectral response of each filter is assumed to be fixed, but initially unknown. The binary array with an unknown filter is exposed repeatedly to light, and the responses of the sensor array and the color values of light are recorded. In the case of a N×N-sensor binary sensor array BINARR, the training data may constitute of binary matrices having N×N values each and the corresponding color values COLORVAL of light used to expose the sensor array.

When the binary pixel array BINARR 1010 is exposed to light, it produces an output signal 1015 from the binary pixels, which may be fed to the statistical module STATMOD 1020. The statistical module may then be operated so that the output of BINARR and the original color values COLORVAL are used to compute an adjustment to the color filter values. This computation may happen iteratively 1025 so that data from multiple exposures are used in module STATMOD. The statistical module may have e.g. 16, 50, 64, 128, 180, 400, 1000, 90000 or 1 million inputs or more.

The training or teaching may happen in sections of the BINARR array, for example so that the color filters corresponding to each group GRP(i,j) is trained at one instance, and the training process iterates through all groups. When the teaching has finished, the color filter values may be stored into a memory.

In the learning phase, the objective is, for each sensor, to determine which filter lies in front of it. In order to do this, measurements of rays of light of a known color (teaching rays) may be made. Each of these measurements may provide a binary matrix M such that the element $M_{ij}$ is 1 when the sensor ij was lit or in the white state and 0 when it wasn't. Together with the information about the color of the light used to expose the sensor array, the matrix M provides us knowledge about the unknown filter setup. Repeating the measurements many enough times with variable input colors may provide more accurate knowledge of the filter setup. The learning phase can be thought as an inverse problem: Given that the color information of light is known, what kind of color filter could have produced the observed binary matrix? For this estimation, maximum a posteriori estimator may be used.

In a Bayesian framework, both estimated and measured variables are considered as random variables. Assume X is a random variable that we want to estimate based on a measured variable Y of which a measurement y is obtained. The probability distribution of X is called a prior distribution, as it describes our knowledge of the variable before the measurement is made. The conditional probability density function $L(x)=P(Y=y|X=x)$ is called the likelihood function—it describes how likely a value x is for variable X, given a measured value y. The conditional probability density function $P(X=x|Y=y)$ is called the posterior distribution as it describes our knowledge of the variable X after the measurement.

Different estimators of X may be used depending on the amount of information that we have of the probability distributions. If no measurement is made, the estimator X may be based solely on the prior distribution of X. If a measurement or several measurements are made but no prior information on X is available, the estimator may be based on likelihood function $L(x)$—for this, a maximum likelihood (ML) estimator can be used. If both prior and measurement data are available, estimators based on posterior distribution can be used, such as the maximum-a-posteriori (MAP) estimator and the posterior mean.

The type of each color filter may be considered as a random variable, thus in a case of N times N binary array, there are $N^2$ random variables. We enumerate the random variables as $X_{ij}$, where i and j are between 1 and N (inclusive). We may assume that the binary sensors are small, and that the size binary sensor array is comparable or less than that of Airy disk caused by the diffraction of light. Thus it may be reasonable to model the photon distribution on sensor array as a homogenous spatial Poisson process.

Filters may be placed independently of their neighbors, i.e. nothing is assumed or known about their spatial correlation. Thus the random variables are $X_{ij}$ are independent. If the possible choices for the color filter in position ij are known, the likelihood function may be written for the random variable $X_{ij}$ based on a single observation, given $M_{ij}$ is observed and the color of light used for exposing the sensor array is known. However, a single observation may not provide enough information to infer the type of color filter at position ij. Since each observation may be assumed to be independent, the likelihood function for n observations may be the product of the likelihood functions of single observations. The complexity of the likelihood function may depend on how faithfully filter and sensor properties, e.g. spectral transmittance and quantum efficiency, are modeled. The maximum likelihood estimate for the type of color filter in the position ij is the mode of the likelihood function, i.e. the values that make the measured data most likely.

Figure 10B:
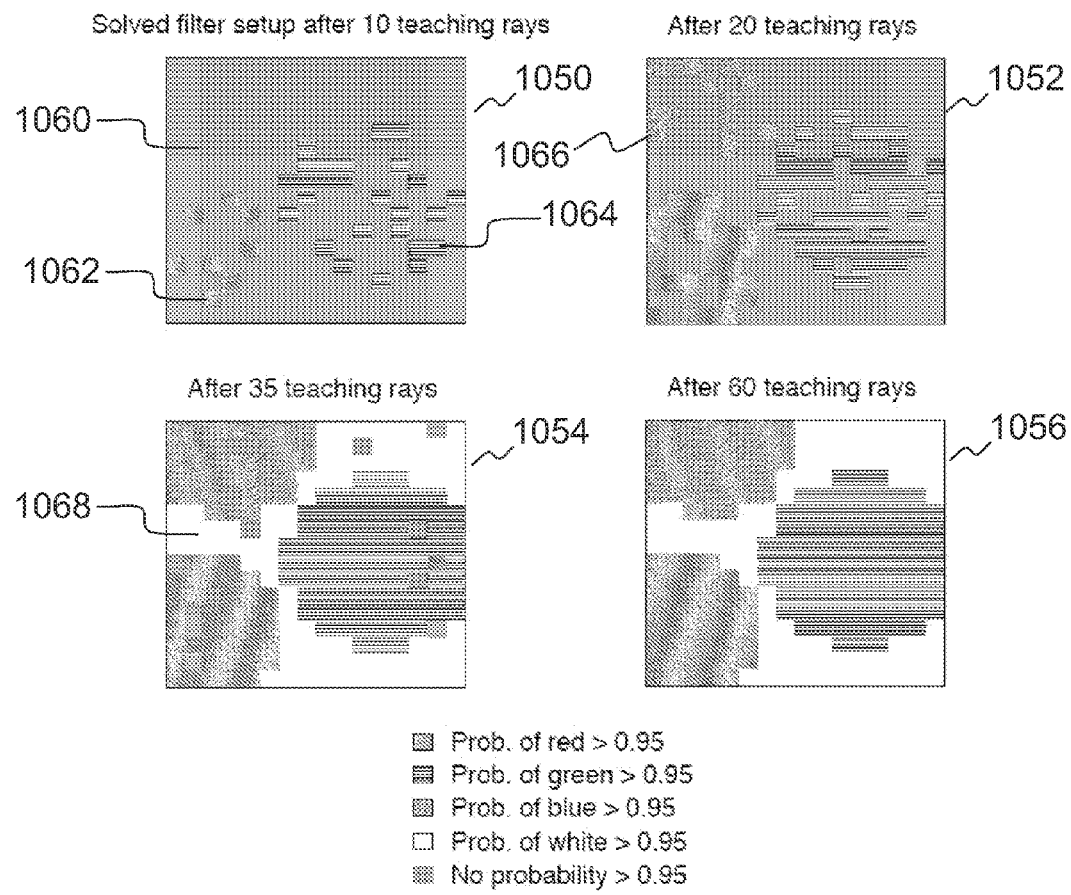
FIG. 10b illustrates a learning process in the determination of color filter values by a statistical method.

FIG. 10b illustrates a learning process in the determination of color filter values by a statistical method. In phase 1050 after 10 iterations, most of the color filter values are undetermined 1060. Some of the color filter values are red 1062 and some are green 1064. After 20 iterations in 1052, there are some blue filter values 1066 appearing, as well. Later, in 1054 when 35 iterations have been done, some of the filter values have been determined to be white 1068. After 60 iterations in 1056, the teaching has been completed and all of the color filter values have been determined.

The statistical module (or the color signal unit CSU1) may be formed electronically for example using analog or digital electronics, and the electronics may comprise memory either externally to the module or embedded to the neural network. The statistical module may be formed by means of computer program code. The statistical module may also be formed optically by means of optical components suitable for optical computing.

Figure 11:
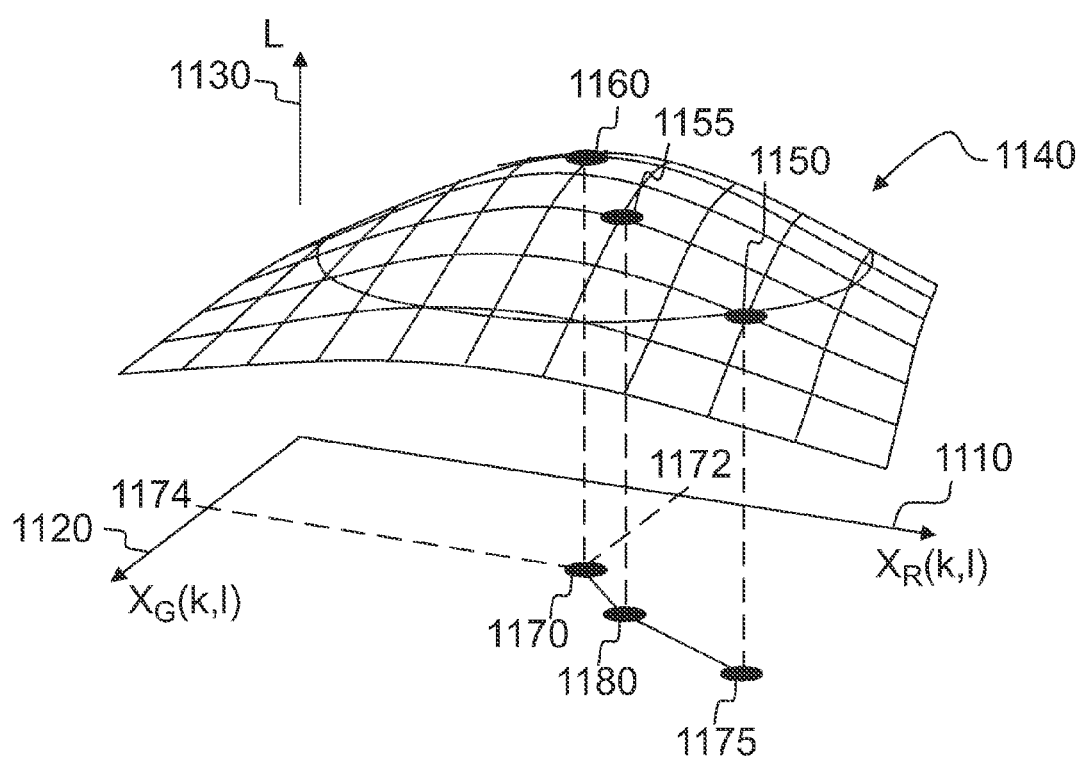
FIG. 11 illustrates a likelihood function for determining color filter values.

FIG. 11 illustrates a likelihood function 1140 for a two-dimensional random variable in an exemplary manner. Let the dimensions of the random variable be R 1110 and G 1120, and thus the random variable X may take values (r,g), where for example r and g are between 0 and 1, inclusive. The likelihood L 1130 in this example case is a function that has one local and global maximum 1160 at point 1170 so that the G-value of X may be $x_G$ and the R-value of X may be $x_R$. When the likelihood is being maximized iteratively, the variable X may have an initial value (point 1175 in the figure) so that the likelihood takes a value 1150. After one iteration, the value of X is 1180 and the likelihood takes the value 1155. Finally, when iteration has been finished, the variable X has reached the maximum likelihood estimate 1170 and the likelihood L reaches the maximum value 1160.

In the context of a binary pixel array with color filters, it may be assumed we have an N times N binary array, and that there is an arbitrary color filter on each binary sensor. We may specify the color of filter using a real valued vector $X \in [0,1]^3$, for instance a white filter corresponds to the vector (1,1,1) and a red filter to the vector (1,0,0). The likelihood function for filter color at the position (i,j) given training data D may be written as $$L(X, D) = \prod_k \left(1 - e^{-(\lambda_R^{(k)} X(1) + \lambda_G^{(k)} X(2) + \lambda_B^{(k)} X(3))/N^2}\right)^{s_k} \cdot$$

$$\left(e^{-(\lambda_R^{(k)} X(1) + \lambda_G^{(k)} X(2) + \lambda_B^{(k)} X(3))/N^2}\right)^{1-s_k},$$

where $s_k \in \{0,1\}$ is the output of the binary sensor at (i,j), when the sensor array is exposed to light with RGB-values $I_R^{(k)}$, $I_G^{(k)}$, $I_B^{(k)}$. The product is over all available training data. It may be assumed that $0^0=1$, and that the filters are ideal in the sense that e.g. green light will essentially not light a sensor with a red filter. If some values of X would cause the likelihood function go to zero, such values of X may be deemed impossible given the data. The most likely filter color based on available data may be the 3-value vector (X(1),X(2),X(3)) which maximizes the likelihood function. If we have some prior knowledge on possible filter colors, i.e. that some colors are more probable than others, this information may be coded into prior distribution and then a maximum posterior estimate may be used.

Figure 12:
FIG. 12 illustrates the determination of color filter values with an energy function.

FIG. 12 illustrates the determination of color filter values by a statistical method using neighborhood information. Here, there may be known or suspected correlation between filter elements (e.g. if it is known that filter colors form piecewise constant regions). In this case, the theory of Markov random fields may be used to speed up the learning phase. We will briefly recall some terminology.

A random field is a collection of random variables $X=(X_i)$, $i \in S$ taking values in some set $\Lambda$ and such that $P(\lambda)>0$ for all $\lambda \in \Lambda^S$. The elements of the index set S are called sites. A neighborhood system is a collection of sets $N_i \subset S$, $i \in S$, such that for all i,j$\in$S, $i \in N_j$ if and only if $j \in N_i$. For given $i \in S$, the elements of $N_i$ are called the neighbors of i. A subset of S is called a clique if any two of its distinct elements are neighbors. A potential V is a collection of $V_C : \Lambda^S \to R$ such that $V_C = 0$ if C is not a clique and $V_C(x) = V_C(y)$ if x and y agree on C. Next we will consider how the theory of Markov random fields can be applied to the problem of filter identification.

The iterative determination of color filter values without and with neighborhood information is displayed in FIG. 12. On the left, the determination of the color filter values without using neighborhood information is shown after 10 iterations 1210, 20 iterations 1212, 40 iterations 1214 and 70 iterations 1216. As shown in 1216, there may be some color filters whose value is unknown after 70 teaching iterations. On the right, the determination of the color filter values using neighborhood information is shown after 10 iterations 1230, 20 iterations 1232, 40 iterations 1234 and 70 iterations 1236. As may be seen, and as may happen in practice, the teaching when neighborhood information is used is converging faster, and less color filters are left without a determinate value after 70 iterations.

Figure 13:
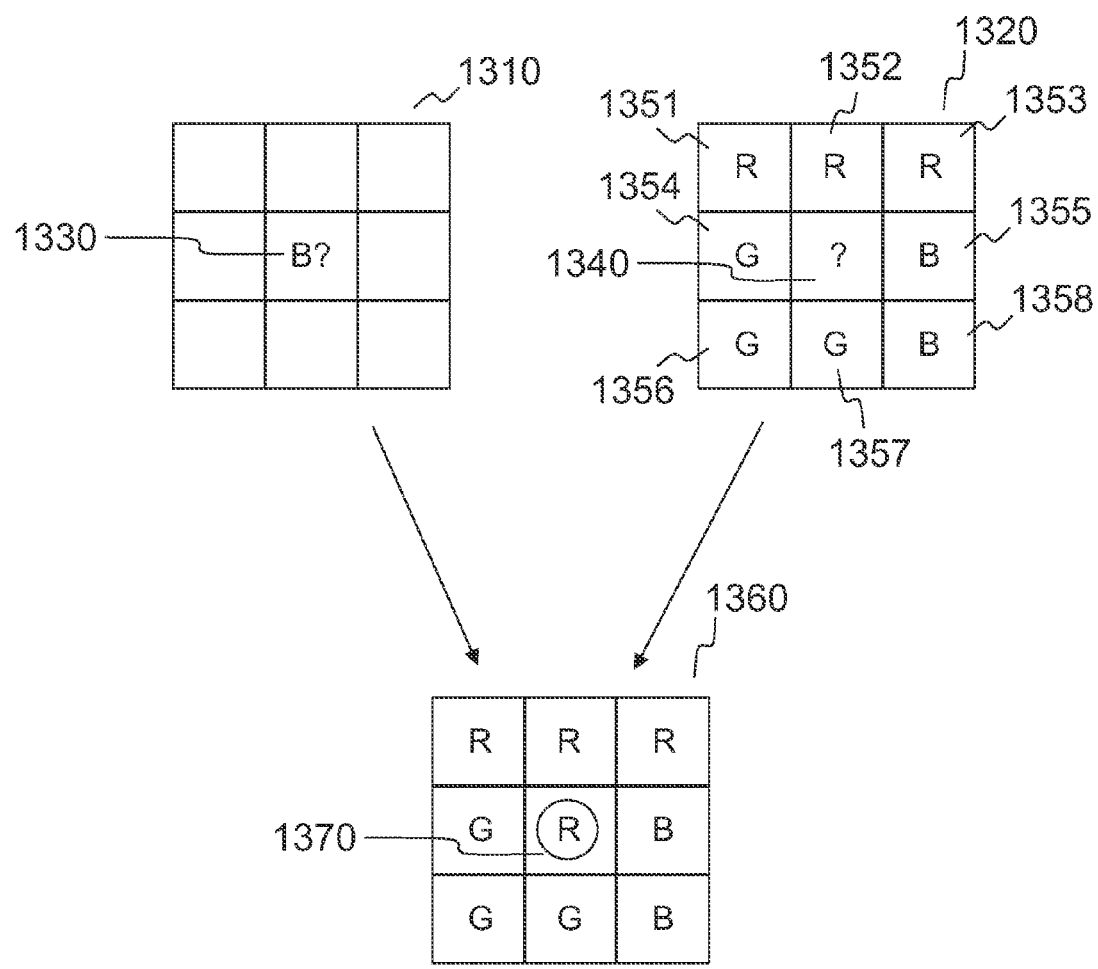
FIG. 13 illustrates the determination of color filter values by a statistical method using neighborhood information.

FIG. 13 illustrates the determination of color filter values with an energy function. The type of each color filter may be considered as a random variable $X_{ij}$. The set of sites S is the set formed by the pairs (i,j), where i and j are between 1 and N (inclusive). We may assume that we have some neighborhood system $N_{ij}$, for instance formed by eight or four spatially closest sites. More complicated neighborhoods can also be considered, and neighbors do not necessarily have to be physical neighbors. We can now define an energy function of the system as a SUM $$H(X) = -\log L(X,D) + \beta K(X),$$

where L(X,D) is a likelihood function which describes how the random variables $X_{ij}$ depend on the data D, $\beta$ is a constant and K(X) is a prior energy function. The posterior probability distribution of $X_{ij}$ can be written in the form $$P(X) = \frac{1}{Z} e^{-H(X)},$$

where Z is a normalization factor.

From the definitions it may follow that the Markov random fields have the following property: the conditional probabilities satisfy $$P(X_{ij}=x_{ij}|X_{kl}=x_{kl},(k,l)\neq(i,j))=P(X_{ij}=x_{ij}|X_{kl}=x_{kl},(k,l)\in N_{ij}),$$

that is, the probability that $X_{ij}=x_{i,j}$ given everything else is fixed, depends essentially only on the values of neighboring sites.

A prior energy function may be chosen such that it may be written as a sum $\Sigma_{A \subset S} V_A(X)$ of potential functions corresponding to the neighborhood system. The prior energy function may be used to express our prior knowledge of filter placements. For example, the prior energy function may be such that it has a higher value for a set of filter colors that change a lot from one pixel to another, and a lower value when the filter colors change less. Such an energy function "prefers" color filter values that change less when the purpose is to minimize the energy.

In FIG. 13, the use of the energy function and its two components are illustrated. In 1310, the middle pixel 1330 may have an initially unknown value of the color filter, and a first estimate for the color filter value may be reached using the data from the binary pixel array. For example, the first estimate for the pixel color may be blue (B).

On the other hand, as shown in 1320, the center pixel 1340 may have a neighborhood, for example an 8-neighborhood, and the color filters of the neighboring pixels may have estimates for their color values. For example, pixels 1351, 1352 and 1353 may have an estimate of a red color filter value, the pixels 1354, 1356 and 1357 may have an estimate of a green color filter value, and the pixels 1355 and 1358 may have an estimate of a blue color filter value. The information of the neighboring pixels may be used to determine the color filter value of pixel 1340.

As explained earlier, the two pieces of information for the color filter value of the center pixel may be combined for example by means of an energy function H. Here, the information in 1310 may be contained in the likelihood function L and the information in 1320 may be contained in the prior energy function K. The two may then be summed as given in an above equation for the energy function. The energy function may then be optimized, e.g. minimized or maximized, in order to find the color filter value. In 1360, the information from 1310 and 1320 has been combined to obtain the color filter value of the center pixel 1370, in this case red.

Figure 14A:
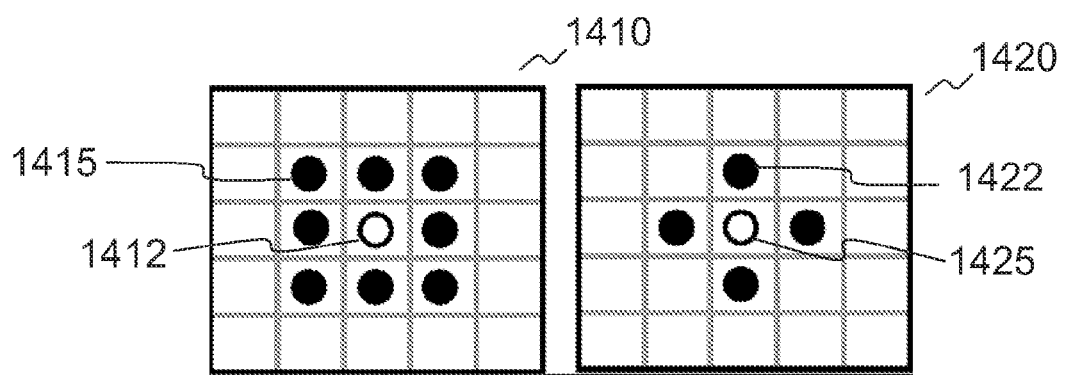
FIG. 14a shows different neighborhoods.

FIG. 14a shows different neighborhoods. In 1410, an eight-neighborhood is shown, where the pixel 1412 has 8 neighbors 1415: four to up, down, left and right, and four diagonally. In 1420, a 4-neighborhood is shown, where the pixel 1422 has 4 neighbors 1425 to up, down, left and right. The neighborhoods may be more complex, for example they may be shaped irregularly, or they may span a longer distance from the pixel. The neighborhoods may also not be continuous, but they can be, as shown in FIG. 14a.

Figure 14B:
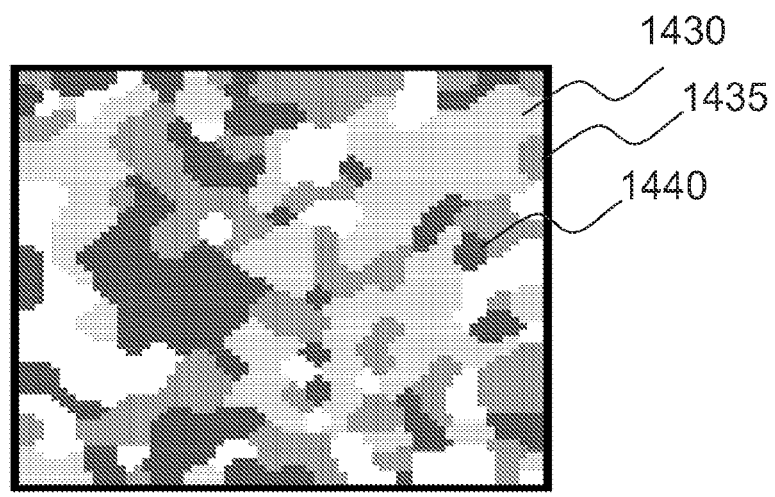
FIG. 14b shows a color filter mosaic with piecewise constant color filter values.

FIG. 14b shows a color filter mosaic with piecewise constant color filter values. As an example, we may consider a case where three different filter colors 1430, 1435 and 1440 form piecewise constant regions. Assume that we have a N times N sensor array, and let $X_{ij}$ be a random variable corresponding to the color of filter at a site (i,j). In this example setup, we assume that each filter is either red, green or blue, thus each random variable $X_{ij}$ is discrete, having three possible values. The likelihoods for filter color at a position (i,j) given data can be written as $$L(X_{ij}=R|D)=\Pi_k(1-e^{-\lambda R^{(k)}/N^2})^{s_k}(e^{-\lambda R^{(k)}/N^2})^{1-s_k}$$

$$L(X_{ij}=G|D)=\Pi_k(1-e^{-\lambda G^{(k)}/N^2})^{s_k}(e^{-\lambda G^{(k)}/N^2})^{1-s_k}$$

$$L(X_{ij}=B|D)=\Pi_k(1-e^{-\lambda B^{(k)}/N^2})^{s_k}(e^{-\lambda B^{(k)}/N^2})^{1-s_k}$$

where we have used the same notation as in the previous example. If we want to use only information provided by training data, we may choose color which maximizes the likelihood above.

Next we will describe how a neighborhood system and prior energy function may be chosen. For a neighborhood system we may choose 8-neighborhood. Here, the cliques are the single element sets, the sets $\{(i,j),(k,l),(n,m)\}$ where the sites are each other's neighbors, and the pairs of sites $\{(i,j),(k,l)\}$ where (i,j) and (k,l) are neighbors. We now define corresponding potential as a set of functions of the form $$V_C(x) = \begin{cases} 1 - \delta(x_{ij}, x_{kl}) & \text{if } C = \{(i, j), (k, l)\} \text{ is a clique} \\ 0 & \text{otherwise} \end{cases},$$

where d(x,y)=1 if x=y, 0 otherwise.

The posterior energy function may now be written as $$H(X) = \sum_{i,j} -\log L(X_{ij}|D) + \beta \sum_C V_C(X),$$

where the second sum is over all cliques. The estimate for filter colors may be obtained by minimizing the posterior energy. Minimizing the posterior energy works to "match" the color filter values to the data D (first term on the right-hand side), i.e. to find out the color filter values that would produce the data D, as well as ensure that the color filter setup is smooth to some degree by minimizing the potential (the second term on the right-hand side).

However, since there are $N^2$ variables, minimizing the energy may be challenging to do directly. Instead, we may use an iterative method called iterated conditional modes: First the variables $X_{ij}$ are initialized to some values. Then we set the variable $X_{ij}$ to the value which minimizes the H(X) when all the other $X_{kl}$ are held fixed. This algorithm may maximizes the conditional probability of $X_{ij}$, given the neighborhood of (i,j). Note that at each step we only need to find a value $x_{ij}$ which decreases the value of function $$H(X_{ij} = x_{ij} \mid X_{kl} = x_{kl}, (k, l) \in \mathcal{N}_{ij}) = $$
$$-\log L(X_{ij} = x_{ij} \mid D) + \beta \sum_{(k,l) \in \mathcal{N}_{ij}} (1 - \delta(x_{ij}, x_{kl})).$$

All the variables $X_{ij}$ may be updated sequentially (for example in random order), and then the iteration may be repeated until convergence is obtained. The algorithm may be greedy, and the goodness of obtained solution may be dependent on starting values.

As one example how the algorithm may work, with reference to FIG. 13 again, consider the following situation: Assume we have the usual 8-neighborhood and that N=4. Assume that the variables $X_{ij}$ are initialized to their maximum likelihood estimates inferred from the likelihood equations; let's say variables $X_{11}$, $X_{12}$, $X_{13}$ are initialized to red, $X_{21}$, $X_{31}$, $X_{32}$ to green and $X_{23}$, $X_{33}$ to blue. Moreover, assume that the likelihood function L shown earlier gives for the variable $X_{22}$ $L(X_{22}=R|D)=0.35$ $L(X_{22}=G|D)=0.25$ $L(X_{22}=B|D)=0.40.$ Variable $X_{22}$ is thus initialized to blue. Since all the variables surrounding $X_{22}$ are initialized to some values, we may update $X_{22}$ using the iterated conditional modes algorithm: the equation for H may be written in the form $$H(X_{22} = x_{22} \mid X_{kl} = x_{kl}, (k, l) \in \mathcal{N}_{22}) =$$
$$-\log L(X_{22} = x_{22} \mid D) + \beta \sum_{(k,l) \in \mathcal{N}_{22}} (1 - \delta(x_{22}, x_{kl})) =$$
$$-\log L(X_{22} = x_{22} \mid D) + \beta(8 - \delta(x_{22}, x_{11}) - \delta(x_{22}, x_{12}) - \delta(x_{22}, x_{13}) -$$
$$\delta(x_{22}, x_{21}) - \delta(x_{22}, x_{23}) - \delta(x_{22}, x_{31}) - \delta(x_{22}, x_{32}) - \delta(x_{22}, x_{33})),$$

and we want to find a value(color) for $X_{22}$ which minimizes the equation. Taking into account the likelihood function values for $X_{22}$ and since there three greens, three reds and two blues in the neighborhood of the variable $X_{22}$, we may get (take for instance b=0.5)

$H(X_{22}=R|X_{kl}=x_{kl}(k,l) \in \mathcal{N}_{22})=-\log(0.35)+\beta \cdot (8-3)=3.55$ $H(X_{22}=G|X_{kl}=x_{kl}(k,l) \in \mathcal{N}_{22})=-\log(0.25)+\beta \cdot (8-3)=3.87$ $H(X_{22}=B|X_{kl}=x_{kl}(k,l) \in \mathcal{N}_{22})=-\log(0.40)+\beta \cdot (8-2)=3.92.$ Since the color minimizing the equation is red, the variable $X_{22}$ is set to red. Other color filter values (for other pixels) may be updated similarly and independently of the process for $X_{22}$. For example:
1) Every $X_{ij}$, i<=4, j<=4 is initialized to its maximum likelihood estimate
2) Every $X_{ij}$ is updated using the procedure illustrated for $X_{22}$
3) If the stopping condition (e.g. number of rounds or low enough energy) is not met, go to the step 2)

As was done in the above example, the estimate for $X_{ij}$ may be fixed to any one value of a discrete number of values. For example, the possible color filter values may be red, green, blue and white, and any combinations, e.g. pink, are not permitted. It is also possible to allow continuous values for the variable X, whereby $X_{ij}$ may get any value in an allowed range.

Figure 14C:
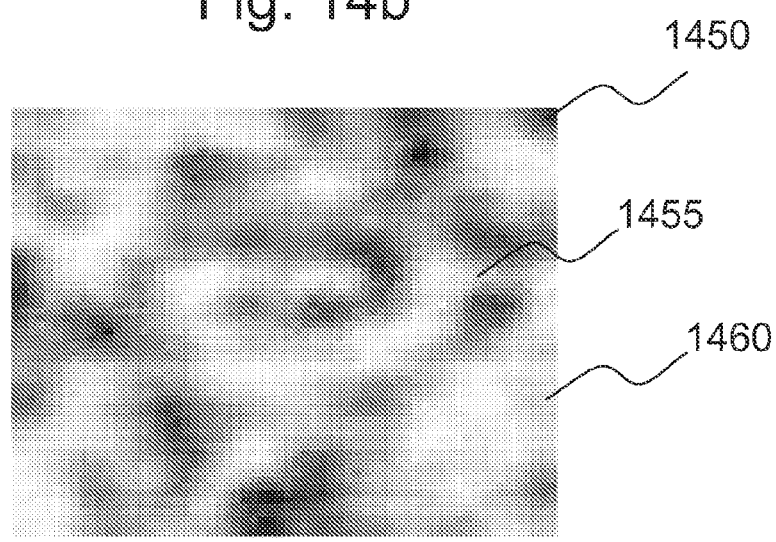
FIG. 14c shows a color filter mosaic with smoothly changing color filter values.

FIG. 14c shows a color filter mosaic with smoothly changing color filter values with three different components 1450, 1455 and 1460. In the example, we consider a color filter array where colors may change smoothly. Using the same notations as with FIG. 11, let $X_{ij}$ be random vector taking values in $[0,1]^3$. We may use the same neighborhood system as in previous example, thus also the cliques are same. We may define potential function $$V_C(x) = \begin{cases} \|x_{ij} - x_{kl}\|^2 & \text{if } C = \{(i, j), (k, l)\} \text{ is a clique} \\ 0 & \text{otherwise} \end{cases}.$$

The posterior energy function may be written as $$H(X) = \sum_{i,j} -\log L(X_{ij} \mid D) + \beta \sum_C V_C(X),$$

where $L(X_{ij}|D)$ is the likelihood function as with FIG. 11. We may minimize the energy function using the same method as in the previous example, or using other stochastic optimization methods, for instance simulated annealing. Minimizing the energy function may lead to finding a color filter setup that is likely to produce the measured data D, as well as have a degree of smoothness due to minimizing the potential function.

Steps and approaches in the previous examples may be combined to consider, for instance, color filter arrays with piecewise continuous regions.

Next, we will consider one more example. Choose the neighborhood of a sensor such that only the four adjacent sensors are considered neighbors of the sensor. The function K(X) may be chosen as follows:

$$K(X) = \sum_C V_C(X),$$

where $$V_C(x) = \begin{cases} 1 - \delta(x_{ij}, x_{kl}) & \text{if } C = \{(i, j), (k, l)\} \text{ is a clique,} \\ 0 & \text{otherwise.} \end{cases}$$

Then K(X) may be written as $K(X) = \sum_{i=1}^{N} \sum_{j=1}^{N-1} (1-\delta(x_{ij},x_{i,j+1})) + \sum_{i=1}^{N-1} \sum_{j=1}^{N} (1-\delta(x_{ij},x_{i+1,j}))$ Now the posterior density function of X may be written as $$P(X) = \frac{1}{Z} L(X, D) \prod_{i=1}^{N} \prod_{j=1}^{N-1} (e^{-\beta})^{1-\delta(x_{ij}, x_{i,j+1})} \prod_{i=1}^{N-1} \prod_{j=1}^{N} (e^{-\beta})^{1-\delta(x_{ij}, x_{i+1,j})}$$

Instead of directly maximizing this density function, a marginal distribution density function may be calculated—or approximated—for each sensor. Consider the filter in front of sensor (k,l); for simplicity assume that the sensor is not on the border of the sensor array. The marginal distribution may now be obtained by summing over all other $x_{ij}$s but $x_{kl}$:

$$P(X_{kl} = x_{kl}) = \sum_{x_{11},\ldots,\widehat{x_{kl}},\ldots,x_{NN}} P(X)$$

$$= \sum_{x_{11},\ldots,\widehat{x_{kl}},\ldots,x_{NN}} \frac{1}{Z} L(X, D) \prod_{i=1}^{N} \prod_{j=1}^{N-1}$$

$$(e^{-\beta})^{1-\delta(x_{ij}, x_{i,j+1})} \cdot \prod_{i=1}^{N-1} \prod_{j=1}^{N} (e^{-\beta})^{1-\delta(x_{ij}, x_{i+1,j})}$$

where the sum is taken in a way that all other $x_{ij}$s get all possible values (R, G, B) except for $x_{kl}$, whose value was given as an attribute. Recall that the likelihood function may be expressed as the product of the sensor-wise likelihoods:

$$L(X, D) = \prod_{i,j=1}^{N,N} L(X_{ij}, D).$$

Next an approximation may be made: the filter colors of the four neighboring sensors may have a larger effect to the sensor than the distant ones and hence only the color filter of the neighbors may be varied. Thus we approximate $$P(X_{kl} = x_{kl}) = \frac{1}{\tilde{Z}} \cdot L(X_{kl} = x_{kl} \mid D)$$

$$\prod_{(i,j)\in\{(k-1,l),(k+1,l),(k,l-1),(k,l+1)\}} \left[ \sum_{x_{ij}} L(X_{ij} = x_{ij} \mid D)(e^{-\beta})^{1-\delta(x_{ij}, x_{kl})} \right],$$

where $\tilde{Z}$ is a normalizing constant. To obtain the maximum a posteriori estimate for the filter in front of the sensor, the probability $P(X_{kl}=x_{kl})$ may be calculated for each $x_{kl} \in \{R, G, B\}$ and the color that gives the maximum posterior probability may be chosen.

Consider an example similar to that in the context of FIG. 14b. Assume again that likelihood function for the variable $X_{22}$ is $L(X_{22}=R|D)=0.35$ $L(X_{22}=G|D)=0.25$ $L(X_{22}=B|D)=0.4$ As for the four neighboring sensors, assume that two of them are likely to be red, one of them likely to be green and one blue. Here, unlike in example 2, also the likelihood functions of the neighboring sensors are needed.

Suppose that the likelihood functions have values as follows:

|  | i = 1, j = 2 | i = 2, j = 1 | i = 2, j = 3 | i = 3, j = 2 |
|---|---|---|---|---|
| $L(X_{ij} = R|D)$ | 0.65 | 0.5 | 0.25 | 0.15 |
| $L(X_{ij} = G|D)$ | 0.2 | 0.15 | 0.7 | 0.2 |
| $L(X_{ij} = B|D)$ | 0.15 | 0.35 | 0.05 | 0.65 |

Taking for instance $\beta=0.5$ we can calculate the marginal posterior distribution of $X_{22}$:

$$P(X_{22} = x_{22}) =$$

$$\frac{1}{\tilde{Z}} \cdot L(X_{22} = x_{22} \mid D) \prod_{(i,j)\in\{(1,2),(2,1),(2,3),(3,2)\}} \left[ \sum_{x_{ij}} L(X_{ij}, D)(e^{-\beta})^{1-\delta(x_{ij}, x_{22})} \right].$$

Calculating this gives the probability of red filter:

$$P(X_{22} = R \mid D) =$$

$$\frac{1}{\tilde{Z}} \cdot 0.35 \cdot (0.65 e^0 + 0.2 e^{-\beta} + 0.15 e^{-\beta}) \cdot (0.5 e^0 + 0.15 e^{-\beta} + 0.35 e^{-\beta}) \cdot$$

$$(0.25 e^0 + 0.7 e^{-\beta} + 0.05 e^{-\beta}) \cdot (0.15 e^0 + 0.2 e^{-\beta} + 0.65 e^{-\beta})$$

The probabilities of other colors are calculated in a similar way; the result is:

$$P(X_{22} = R \mid D) = 0.114 \frac{1}{\tilde{Z}}$$

$$P(X_{22} = G \mid D) = 0.069 \frac{1}{\tilde{Z}}$$

$$P(X_{22} = B \mid D) = 0.107 \frac{1}{\tilde{Z}}.$$

The normalizing constant $\tilde{Z}$ must be such that the probabilities sum up to 1, hence $\tilde{Z}=0.114+0.069+0.107$. Now, the marginal posterior probabilities are $P(X_{22}=R|D)=0.39$ $P(X_{22}=G|D)=0.24$ $P(X_{22}=B|D)=0.37$ Thus, the color that maximizes the probability density function is red. The marginal probabilities are calculated in a similar way for every interior sensor, i.e. a sensor that is not on the border of the sensor array.

As was done in the above example, the estimate for $X_{ij}$ may be fixed to any one value of a discrete number of values. For example, the possible color filter values may be red, green, blue and white, and any combinations, e.g. pink, are not permitted. It is also possible to allow continuous values for the variable X, whereby $X_{ij}$ may get any value in an allowed range.

Figure 15:
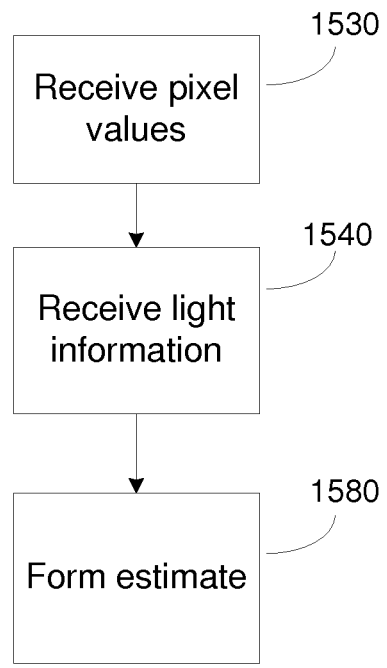
FIG. 15 shows a method for determining color filter values by a statistical method.

FIG. 15 shows a method for determining color filter values by a statistical method. In 1530, pixel values from a binary pixel array are received. These pixel values may have been formed so that light has passed through an optical arrangement for example so that it forms an image on the array, or so that it does not form an image on the array. When light arrives onto the array, it may pass through a color filter on top of a binary pixel. The color of the color filter determines whether the light will be stopped by the color filter or whether it will pass through and may activate the pixel. In 1540, information may be received on the light that was used to expose the pixel array, for example, the color of the light on a pixel may be received. In 1580, an estimate of the color of the color filter F(k,l) may be formed, for example by using a maximum likelihood estimate. The binary pixels having associated color filters may have been exposed to a picture formed by the optics, and the binary pixels may produce a set of input pixel values.

Knowing the values of the color filters, the input pixel values P1 of image IMG1 may be applied to the color signal unit CSU1 to compute the output pixel values P2. This forming of the output pixel values may be carried out using a statistical approach, for example a maximum likelihood approach, or a neural network approach. The output pixel values may then be used to compose an output image IMG2, for example by arranging the pixels into the image in rectangular shape. It needs to be appreciated, as explained earlier, that the values of binary pixels formed by the optics and image sensors may have been captured earlier, and in this method they may merely be input to the learning system. It also needs to be appreciated that it may be sufficient to produce output pixels from the image processing system, and forming the output image IMG2 may not be needed.

Figure 16:
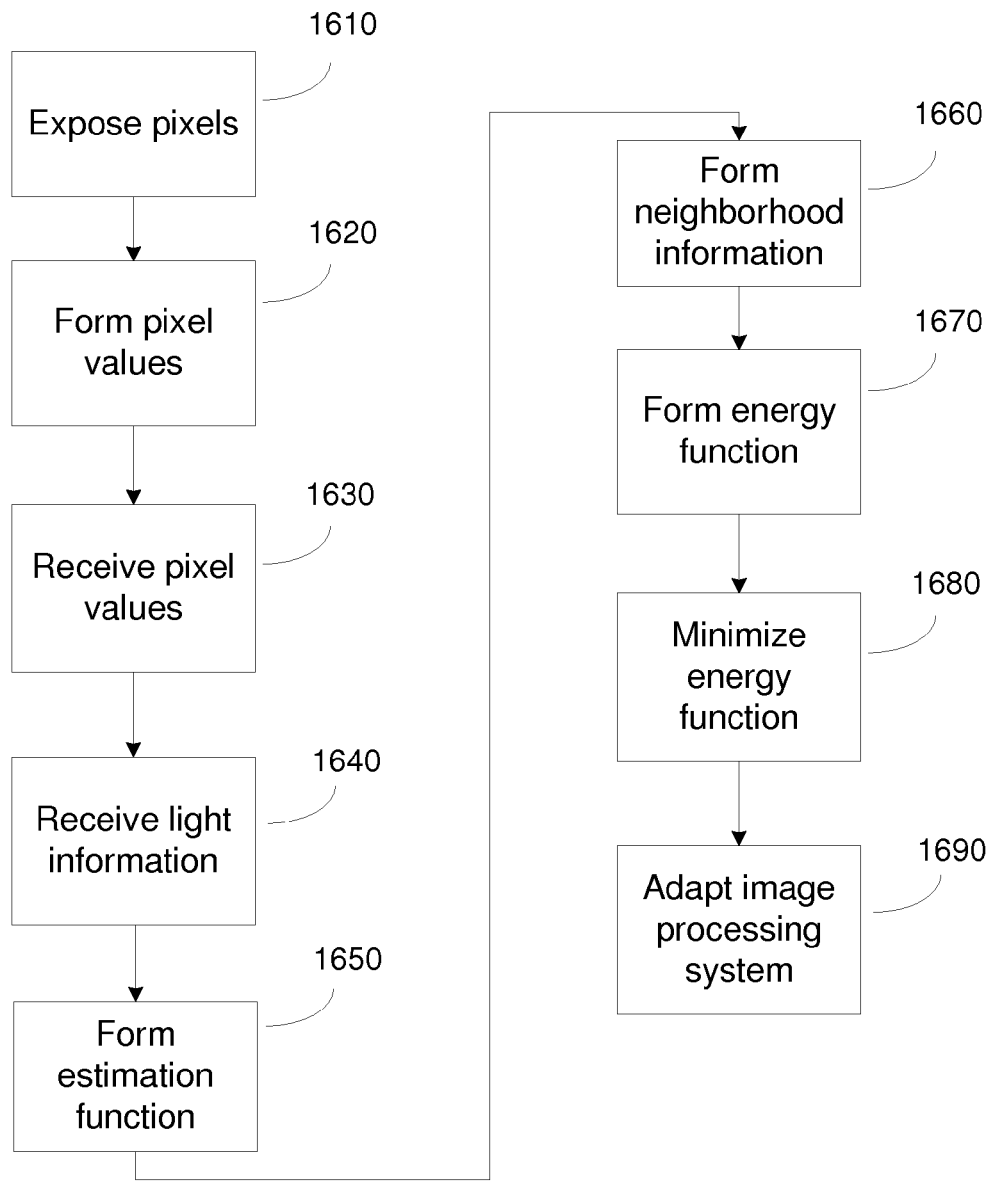
FIG. 16 shows a method for determining color filter values by a statistical method.

FIG. 16 shows a method for determining color filter values by a statistical method. In 1610, the binary pixels having associated color filters may be exposed to a known picture or input light. For example, the binary pixel array may be exposed to monochrome light such as a color light or light from a laser. The binary pixel array may also be exposed to a known picture, for example a pattern of colors. There may be multiple exposures done in order to get more data for the determination of the color filter colors. In 1620, the binary pixels may produce a set of input pixel values. This may happen so that the color filters determine whether a ray of light passes through to a binary pixel, and the binary pixel may then activate in a statistical manner, as explained earlier.

In 1630, pixel values from a binary pixel array may be received. The binary pixel values may be a string of bits, or the pixel values may be compressed. The received binary pixel values may be stored to a memory. In 1640, information may be received on the light that was used to expose the pixel array, for example, the color of the light on pixels may be received. This information on the light may be stored in a memory.

In 1650, an estimation function for determining the color filter values may be formed. The data produced by the binary pixel array may be used in determining the estimation function. For example, a likelihood function may be formed using the binary pixel values. In 1660, neighborhood information may be formed, for example information on the colors of the color filters of the neighbors of the pixel. In 1670, an energy function may be formed using estimation function and neighborhood information. The energy function may form a good balance in using the measurement data and the neighboring pixels' color filter values. In 1680, an estimate of the color of the color filter may be formed, for example by minimizing the energy function formed in 1670. The minimization may happen iteratively for each pixel, it may happen in a random order for the pixels, or for example by simulated annealing.

The exposure of the binary pixels may also be carried out separately, and the values of the binary pixels associated with each exposure may be recorded. Then, instead of exposing the binary pixels, the training method may be applied to the statistical unit separately. In fact, the training may happen in a completely separate device having an appropriate setup for applying the statistical computations. This may be done, for example, to be able to compute the colors of the color filters faster.

Using a statistical approach for determining color filter values may have advantages, for example because the placement or type of color filters may not need to be known in advance. Assuming that the filter setup remains constant, the learning phase has to be solved only once. The learning phase may be carried out in a factory or laboratory environment in which the spectra or the RGB values of the teaching rays may be known. The approach may also be used to calibrate the imaging device at a later time. The approach may also be used to correct color errors of the imaging optics.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment.

It is clear that the present invention is not limited solely to the above-presented embodiments, but it can be modified within the scope of the appended claims.

The invention claimed is:

1. A method comprising:
receiving first binary pixel values, the first binary pixel values having been obtained by applying light of a first known color through an array of color filters onto an array of binary pixels, individual ones of said color filters being of unknown color;
receiving second binary pixel values, the second binary pixel values having been obtained by applying light of a second known color through said array of color filters onto said array of binary pixels;
receiving information on the colors of said light of said first and second known colors applied through said array of color filters onto said array of binary pixels;
forming an estimate of a color of a color filter associated with each of said binary pixels having binary pixel values indicating activation by said light of at least one of said known colors using said information on the colors of said light of said first and second known colors; and
storing estimates of the colors of said color filters in an image processing system for subsequent use in processing images.

2. The method according to claim 1, further comprising:
exposing said binary pixels to said light of said first and second known colors through color filters superimposed on said binary pixels, said light having passed through an optical arrangement, and
forming said binary pixel values from the output of said binary pixels.

3. The method according to claim 1, further comprising:
forming said estimate using likelihood estimation, and
refining said estimate iteratively.

4. The method according to claim 1, further comprising:
determining neighborhoods of each of said binary pixels, and
using estimated values of binary pixels in said neighborhoods of each of said binary pixels as information in forming said estimate for each of said binary pixels.

5. The method according to claim 4, further comprising:
forming said estimate by optimizing an energy function having a first component indicative of similarity of said color of said color filter and said color of said light of at least one of said known colors and a second component indicative of at least one difference in values of each of said binary pixels and a neighbor of each of said binary pixels.

6. The method according to claim 1, wherein adjusting is performed in said image processing system to form initial values of the color filters of said binary pixels or to calibrate the values of the color filters of said binary pixels.

7. An apparatus comprising:
at least one processor, and
a memory including computer program code, the memory and the computer program code configured, with the at least one processor, to cause the apparatus to perform at least the following:
receive first binary pixel values, the first binary pixel values having been obtained by applying light of a first known color through an array of color filters onto an array of binary pixels, individual ones of said color filters being of unknown color;
receive second binary pixel values, the second binary pixel values having been obtained by applying light of a second known color through said array of color filters onto said array of binary pixels;
receive information on the colors of said light of said first and second known colors applied through said array of color filters onto said array of binary pixels;
form an estimate of a color of a color filter associated with each of said binary pixels having binary pixel values indicating activation by said light of at least one of said known color colors using said information on the color of said light; and
store estimates of the colors of said color filters in an image processing system for subsequent use in processing images.

8. The apparatus according to claim 7, further comprising computer program code configured, with the processor, to cause the apparatus to perform at least the following:
expose said binary pixels to said light of said first and second known colors through color filters superimposed on said binary pixels, said light having passed through an optical arrangement, and
form said binary pixel values from the output of said binary pixels.

9. The apparatus according to claim 7, further comprising computer program code configured, with the processor, to cause the apparatus to perform at least the following:
form said estimate using likelihood estimation, and
refine said estimate iteratively.

10. The apparatus according to claim 7, further comprising computer program code configured, with the processor, to cause the apparatus to perform at least the following:
determine neighborhoods of each of said binary pixels, and
use estimated values of binary pixels in said neighborhoods of each of said binary pixels as information in forming said estimate for each of said binary pixels.

11. The apparatus according to claim 10, further comprising computer program code configured, with the processor, to cause the apparatus to perform at least the following:
form said estimate by optimizing an energy function having a first component indicative of similarity of said color of said color filter and said color of said light of at least one of said known colors and a second component indicative of at least one difference in values of each of said binary pixels and a neighbor of each of said binary pixels.

12. The apparatus according to claim 7, further comprising computer program code configured, with the processor, to cause the apparatus to perform at least the following:
adjusting said image processing system to form initial values of the color filters of said binary pixels or to calibrate the values of the color filters of said binary pixels.

13. The apparatus according to claim 7, further comprising:
a color signal unit comprising at least one neural network, and a memory for storing parameters and/or weights of at least one said neural network.

14. The apparatus according to claim 7, further comprising:
an optical arrangement for forming an image,
an array of binary pixels for detecting said image, and
groups of said binary pixels.

15. The apparatus according to claim 7, further comprising:
at least one color filter superimposed on an array of binary pixels, said color filter being superimposed on said array of binary pixels in a manner that is at least one of the group of non-aligned, irregular, random, and unknown superimposition.

16. A system comprising:
at least one processor, and
a memory including computer program code, the memory and the computer program code configured, with the at least one processor, to cause the system to perform at least the following:
receive first binary pixel values, the first binary pixel values having been obtained by applying light of a first known color through an array of color filters onto an array of binary pixels, individual ones of said color filters being of unknown color;
receive second binary pixel values, the second binary pixel values having been obtained by applying light of a second known color through an array of color filters onto said array of binary pixels;
receive information on the colors of said light of said first and second known colors applied through said array of color filters onto said array of binary pixels;
form an estimate of a color of a color filter associated with each of said binary pixels having binary pixel values indicating activation by said light of at least one of said known color colors using said information on the colors of said light of said first and second known colors; and
store estimates of the colors of said color filters in an image processing system for subsequent use in processing images.

17. The system according to claim 16, wherein the system further comprises:
an adjusting unit configured to receive said binary pixel values and said information on the colors of said light of said first and second known colors, and to form an estimate of a color of said color filter associated with each of said binary pixels by using said binary pixel values and said information on the colors of said light of said first and second known colors, and
an image processing unit comprising a binary pixel array with color filters and configured to form images, wherein said image processing unit is configured to receive adjustment information from said adjusting unit for adapting said image processing unit.

18. A computer program product stored on a non-transitory computer readable storage medium and executable in a data processing device, wherein the computer program product comprises:
a computer program code section for receiving first binary pixel values, the first binary pixel values having been obtained by applying light of a first known color through an array of color filters onto an array of binary pixels, individual ones of said color filters being of unknown color, and for receiving second binary pixel values, the second binary pixel values having been obtained by applying light of a second known color through said array of color filters onto said array of binary pixels;

a computer program code section for receiving information on the colors of said light of said first and second known colors applied through said array of color filters onto said array of binary pixels;

a computer program code section for forming an estimate of a color of a color filter associated with each of said binary pixels having binary pixel values indicating activation by said light of at least one of said known colors using said information on the colors of said light of said first and second known colors; and a computer program code section for storing estimates of the colors of said color filters in an image processing system for subsequent use in processing images.

19. The computer program product according to claim 18, wherein the computer program product further comprises:

a computer program code section for adjusting said image processing system to form initial values of the color filters of said binary pixels or to calibrate the values of the color filters of said binary pixels.

* * * * *

UNITED STATES PATENT AND TRADEMARK OFFICE
CERTIFICATE OF CORRECTION

PATENT NO.       : 9,210,386 B2
APPLICATION NO.  : 13/518687
DATED            : December 8, 2015
INVENTOR(S)      : Rissa et al.

Page 1 of 1

It is certified that error appears in the above-identified patent and that said Letters Patent is hereby corrected as shown below:

In the Claims

Claim 7, col. 23, line 29 "color" should be deleted. (1st occurrence)

Claim 16, col. 24, line 42 "color" should be deleted.

Signed and Sealed this
Twenty-first Day of June, 2016

Michelle K. Lee
*Director of the United States Patent and Trademark Office*